(12) United States Patent
Toma et al.

(10) Patent No.: US 9,918,019 B2
(45) Date of Patent: *Mar. 13, 2018

(54) CONVERSION METHOD AND CONVERSION APPARATUS

(71) Applicant: Panasonic Intellectual Property Management Co., Ltd., Osaka (JP)

(72) Inventors: Tadamasa Toma, Osaka (JP); Kengo Terada, Osaka (JP); Masayuki Kozuka, Osaka (JP); Takahiro Nishi, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/584,365

(22) Filed: May 2, 2017

(65) Prior Publication Data

US 2017/0237907 A1    Aug. 17, 2017

Related U.S. Application Data

(63) Continuation of application No. 15/367,227, filed on Dec. 2, 2016, which is a continuation of application No. PCT/JP2015/002612, filed on May 25, 2015.
(Continued)

(30) Foreign Application Priority Data

Apr. 24, 2015   (JP) .................................. 2015-089834

(51) Int. Cl.
*H04N 5/243*   (2006.01)
*H04N 9/64*    (2006.01)
*H04N 5/235*   (2006.01)

(52) U.S. Cl.
CPC ........... *H04N 5/243* (2013.01); *H04N 5/2351* (2013.01); *H04N 9/64* (2013.01)

(58) Field of Classification Search
CPC ......... H04N 5/243; H04N 5/2351; H04N 9/64
See application file for complete search history.

(56) References Cited

U.S. PATENT DOCUMENTS

2013/0329778 A1   12/2013  Su et al.
2014/0002479 A1    1/2014  Muijs et al.
(Continued)

FOREIGN PATENT DOCUMENTS

JP   2008-167418    7/2008
WO   2013/046095    4/2013

OTHER PUBLICATIONS

International Search Report of PCT application No. PCT/JP2015/002612 dated Jul. 7, 2015.
(Continued)

*Primary Examiner* — Michael Teitelbaum
(74) *Attorney, Agent, or Firm* — Wenderoth, Lind & Ponack, L.L.P.

(57) ABSTRACT

A conversion method for converting luminance of a video, including a luminance value in a first luminance range, to be displayed on a display apparatus includes: acquiring a first luminance signal indicating a code value obtained by quantization of the luminance value of the video; and converting the code value indicated by the acquired first luminance signal into a second luminance value determined based on a luminance range of the display apparatus, the second luminance value being compatible with a second luminance range with a maximum value smaller than a maximum value of the first luminance range and larger than 100 nit. This provides the conversion method capable of achieving further improvement.

4 Claims, 24 Drawing Sheets

Related U.S. Application Data

(60) Provisional application No. 62/010,096, filed on Jun. 10, 2014.

(56) References Cited

U.S. PATENT DOCUMENTS

| | | |
|---|---|---|
| 2014/0050271 A1 | 2/2014 | Su et al. |
| 2014/0079113 A1 | 3/2014 | Newton et al. |
| 2014/0210847 A1 | 7/2014 | Knibbeler et al. |

OTHER PUBLICATIONS

Extended European Search Report dated May 29, 2017 in corresponding European Application No. 15807114.2.

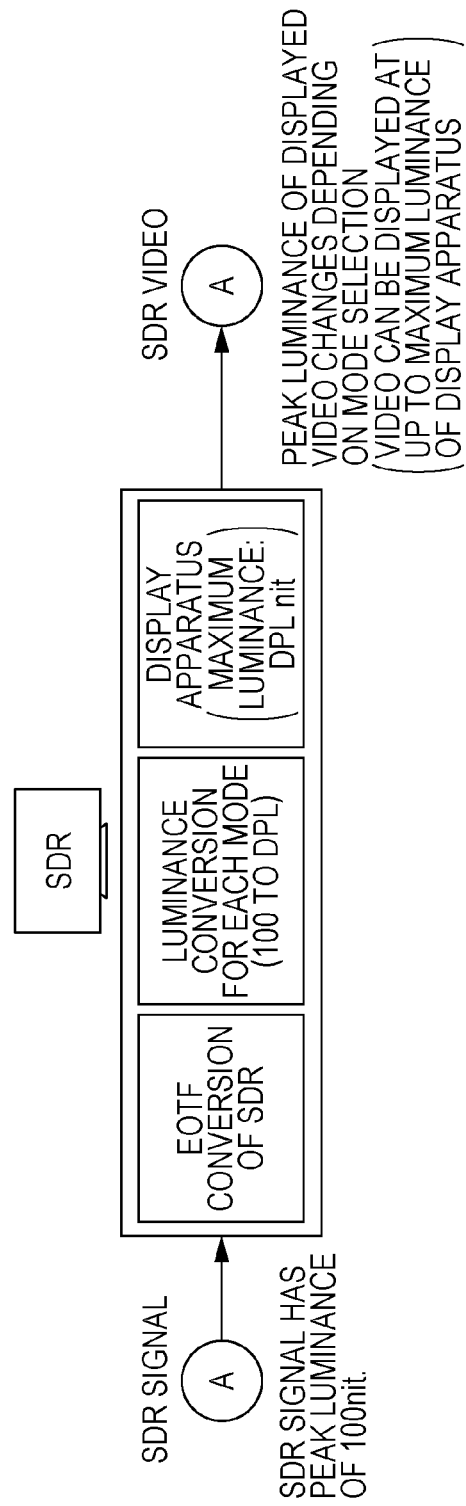

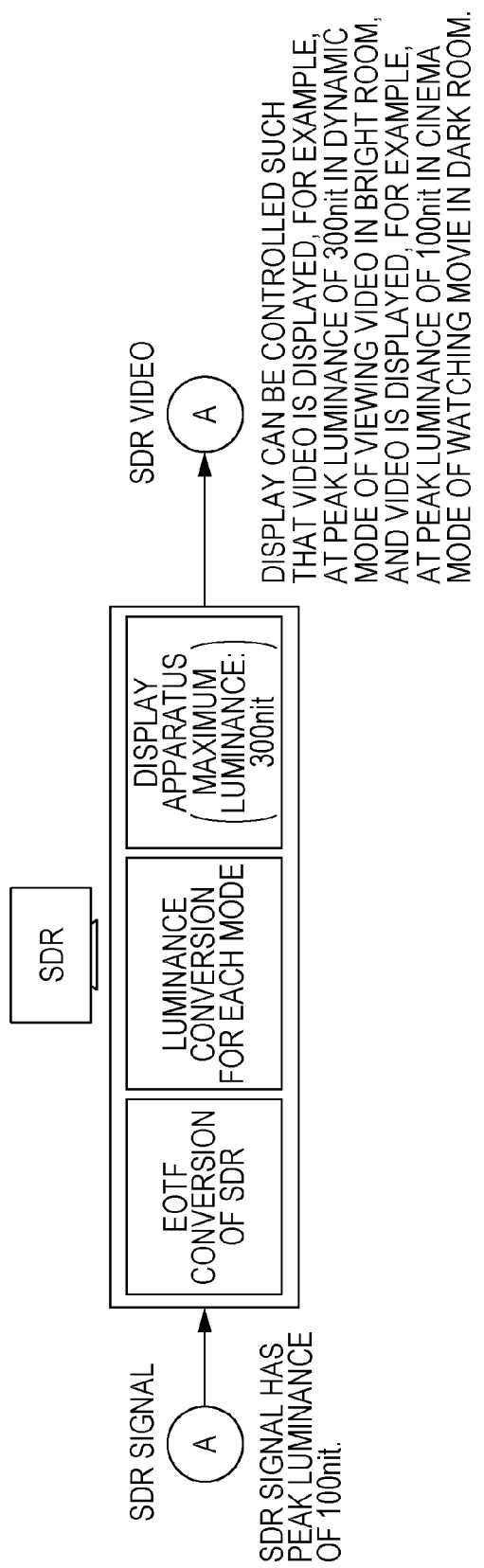

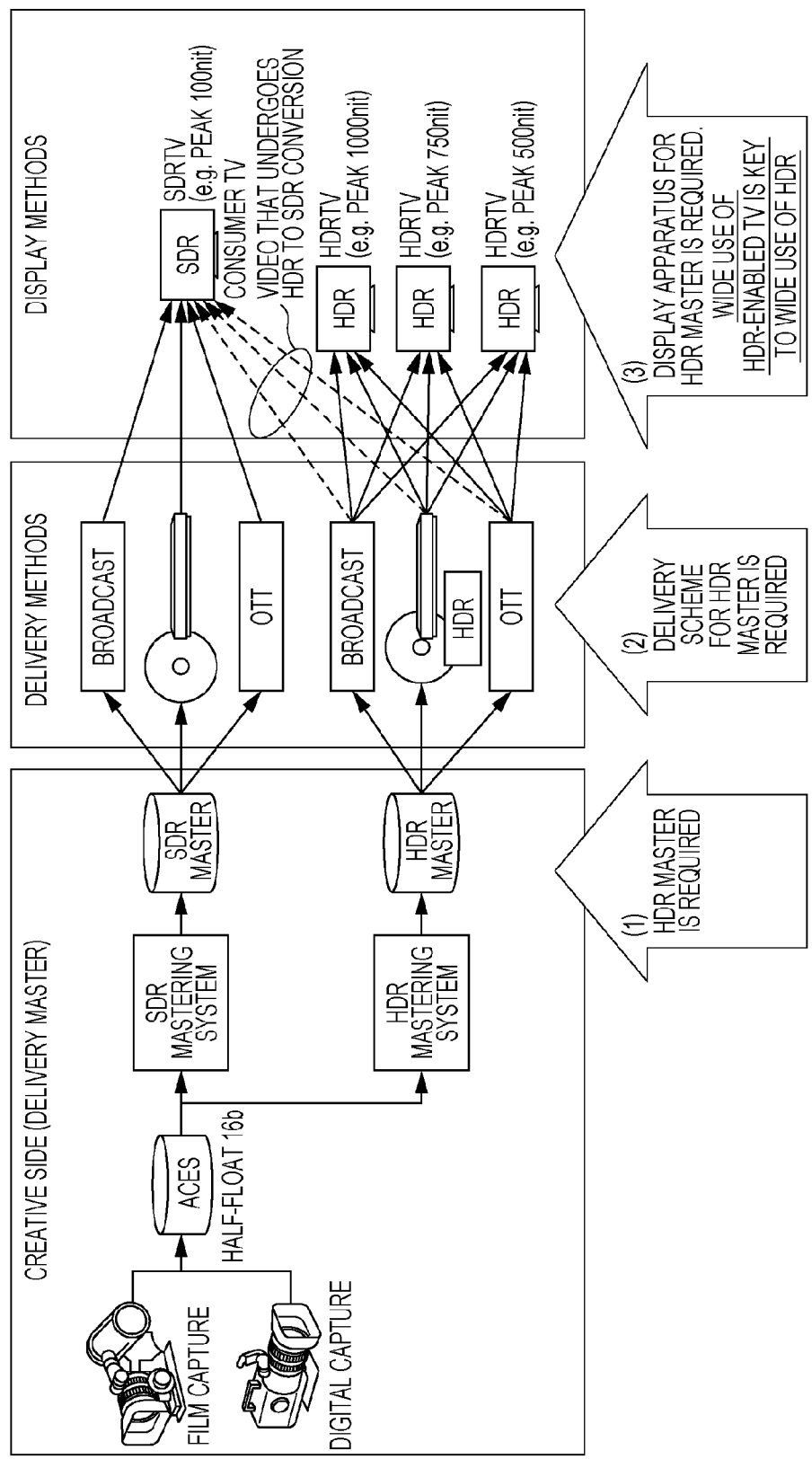

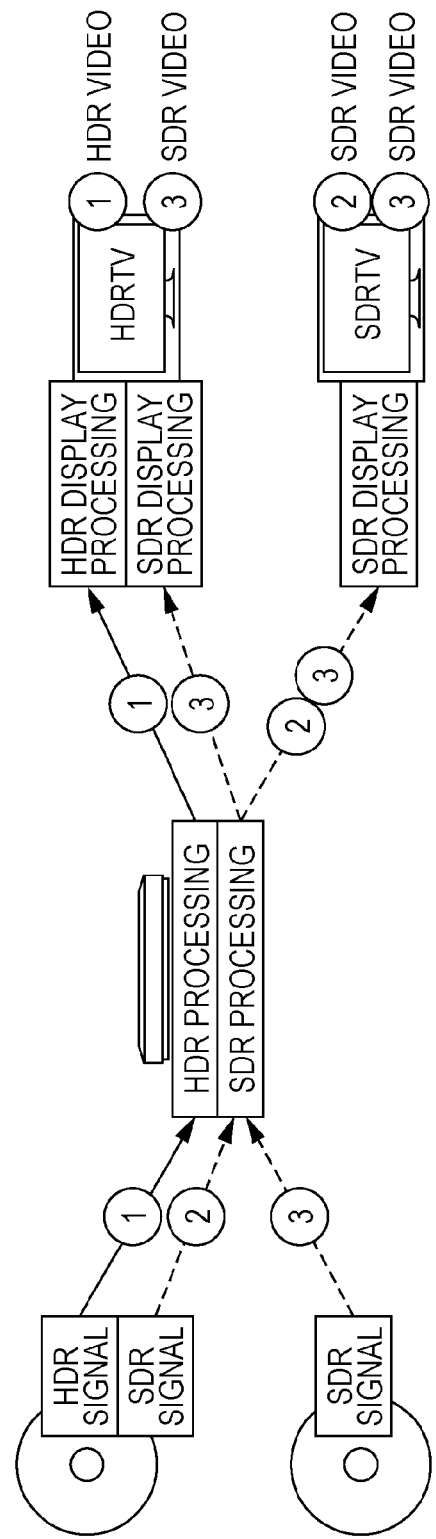

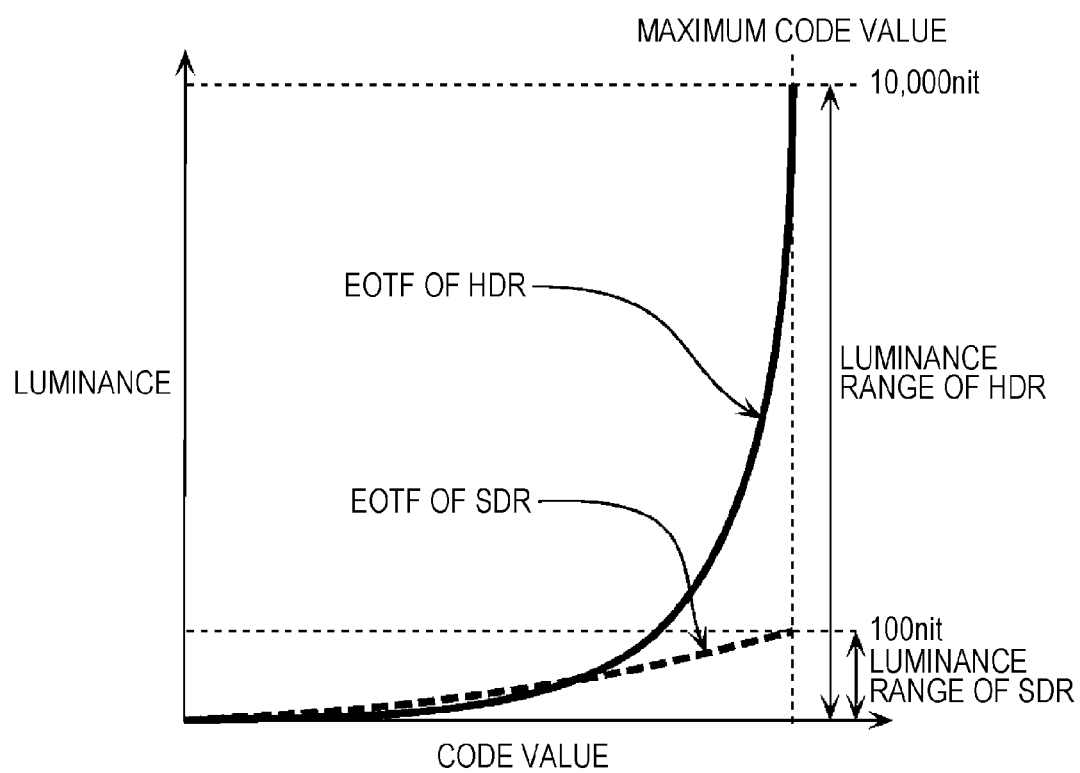

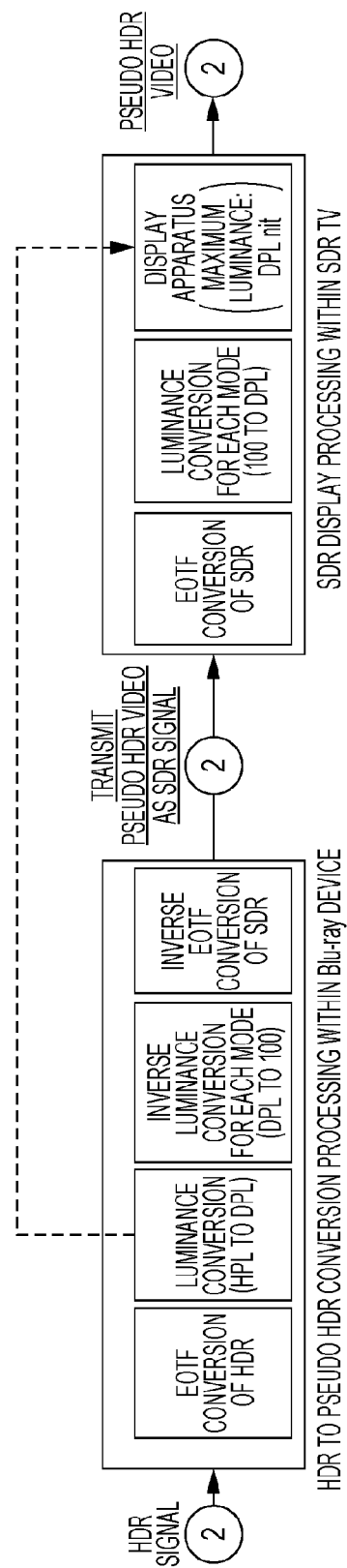

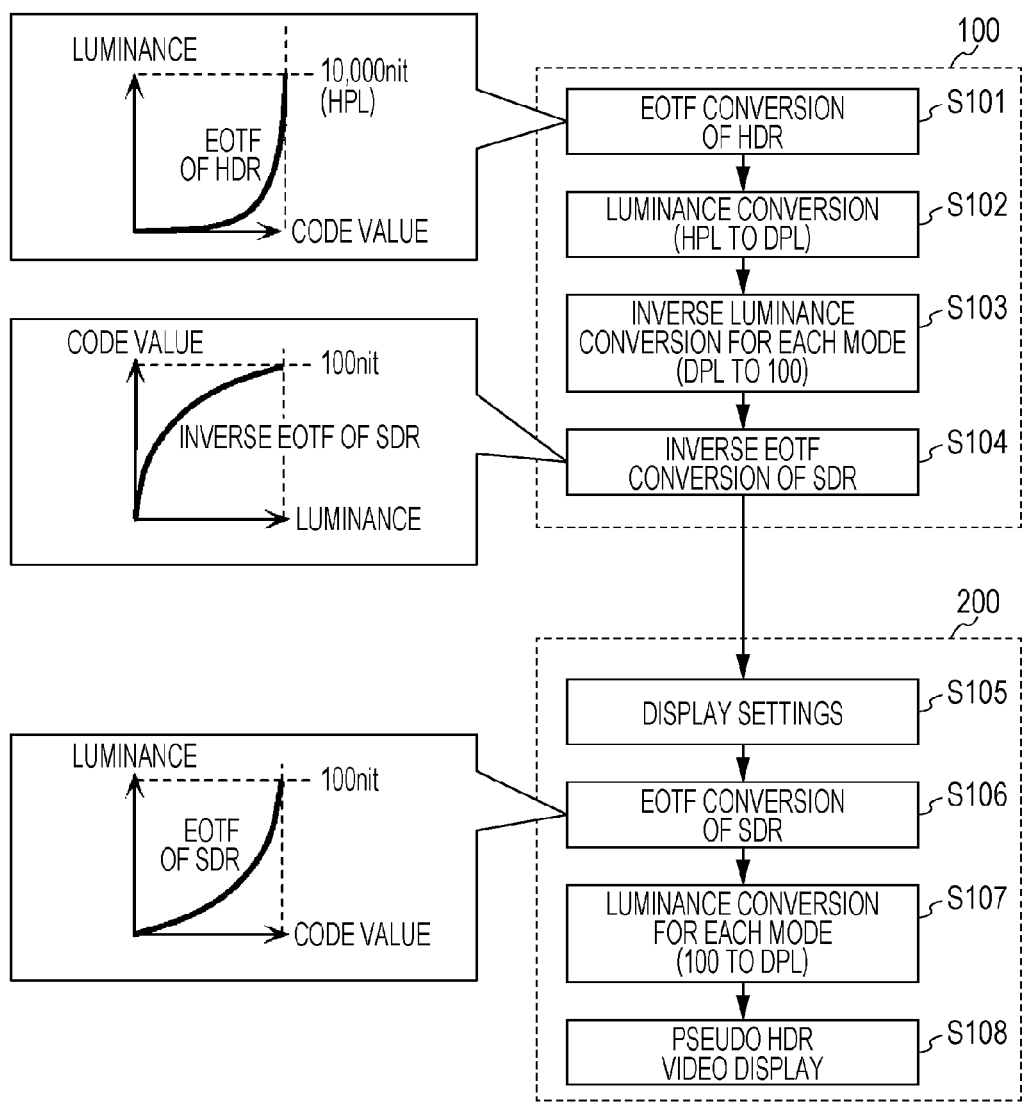

HPL: HDR PEAK LUMINANCE
DPL: DISPLAY PEAK LUMINANCE
CPL: CONTENT PEAK LUMINANCE
CAL: CONTENT AVERAGE LUMINANCE

HPL: HDR PEAK LUMINANCE
DPL: DISPLAY PEAK LUMINANCE
CPL: CONTENT PEAK LUMINANCE
CAL: CONTENT AVERAGE LUMINANCE

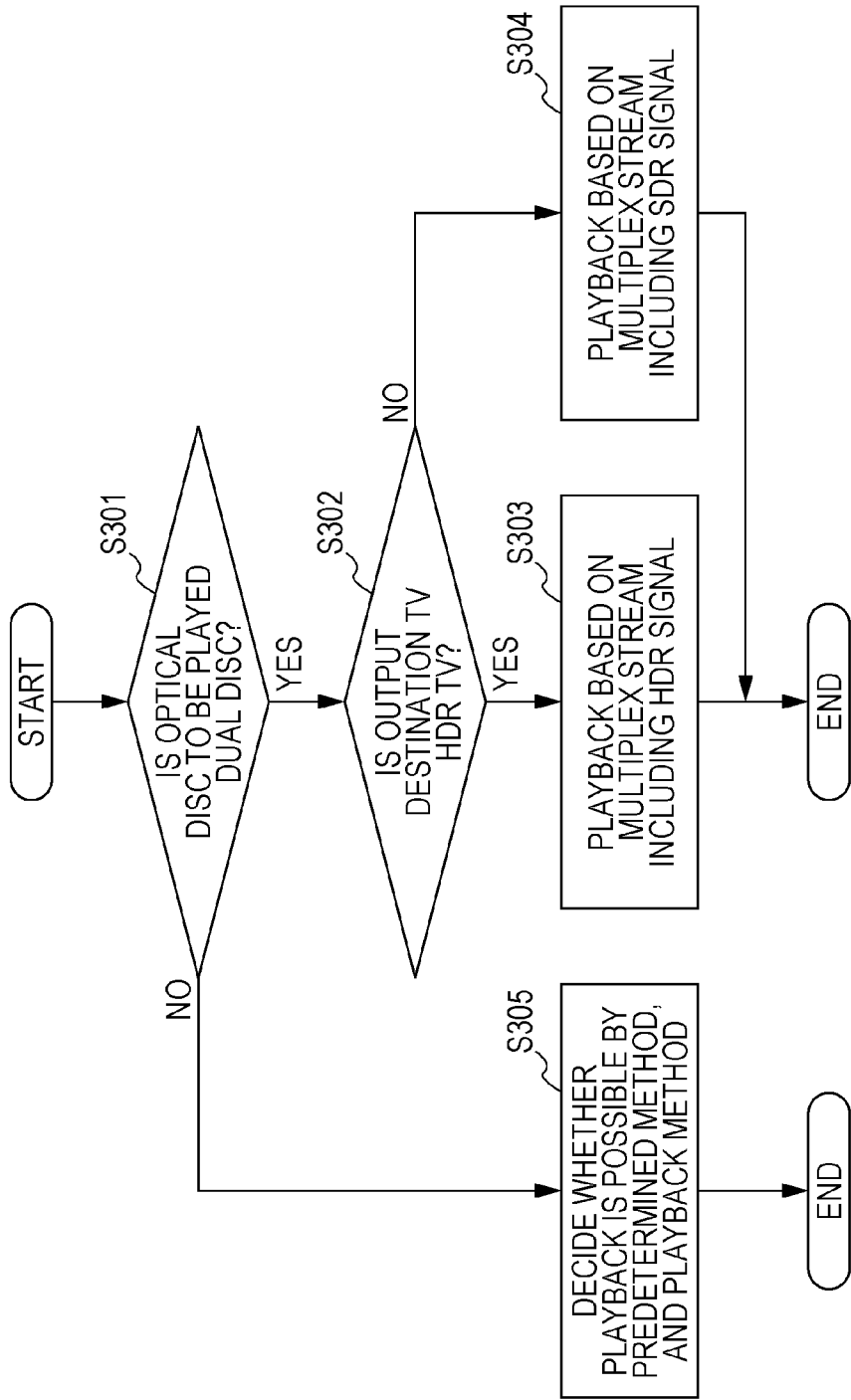

CONVERSION METHOD AND CONVERSION APPARATUS

BACKGROUND

1. Technical Field

The present disclosure relates to a conversion method and conversion apparatus regarding luminance of a video.

2. Description of the Related Art

Conventionally, an image signal processing apparatus for improving a displayable luminance level is disclosed (for example, refer to Unexamined Japanese Patent Publication No. 2008-167418).

SUMMARY

The above-described conventional technology needs further improvement.

In one general aspect, the techniques disclosed here feature a conversion method for converting luminance of a video to be displayed on a display apparatus, the conversion method including: acquiring a first luminance signal indicating a first code value obtained by quantization of the luminance value of the video, the luminance value of the video being included in a first luminance range; and converting the first code value indicated by the acquired first luminance signal into a second luminance value compatible with a second luminance range, a maximum value of the second luminance range being determined based on a luminance range of the display apparatus, the maximum value of the second luminance range being smaller than a maximum value of the first luminance range, and the maximum value of the second luminance range being larger than 100 nit.

Note that these general or specific aspects may be implemented using an apparatus, a system, an integrated circuit, a computer program, or a computer-readable recording medium such as a CD-ROM, or may be implemented using an arbitrary combination of an apparatus, a system, a method, a computer program, and a recording medium.

The above-described aspect can achieve further improvement.

Note that further effects and advantages of the present disclosure will be apparent from the disclosed details of the present specification and the drawings. The above-described further effects and advantages may be individually provided by various exemplary embodiments and features disclosed in the present specification and the drawings, and all the effects and advantages do not necessarily need to be provided.

BRIEF DESCRIPTION OF THE DRAWINGS

FIG. 4A is a diagram illustrating SDR display processing within an SDR TV;

FIG. 4B is a diagram illustrating the SDR display processing within the SDR TV with peak luminance of 300 nit;

FIG. 5 is a diagram illustrating conversion from HDR to SDR;

FIG. 6B is a diagram illustrating case 2 where an HDR disc stores an HDR-enabled HDR signal and an SDR-enabled SDR signal;

FIG. 8A is a diagram illustrating an example of an electro-optical transfer function (EOTF) that supports each of HDR and SDR;

FIG. 10C is a diagram illustrating one example of display processing to perform HDR display using the HDR-enabled playback apparatus and the SDR TV connected to each other via a standard interface;

FIG. 12 is a flowchart illustrating a conversion method and a display method to be performed by the conversion apparatus and the display apparatus according to the exemplary embodiment;

FIG. 19 is a flowchart illustrating the playback operation of a dual disc.

Figure 1:
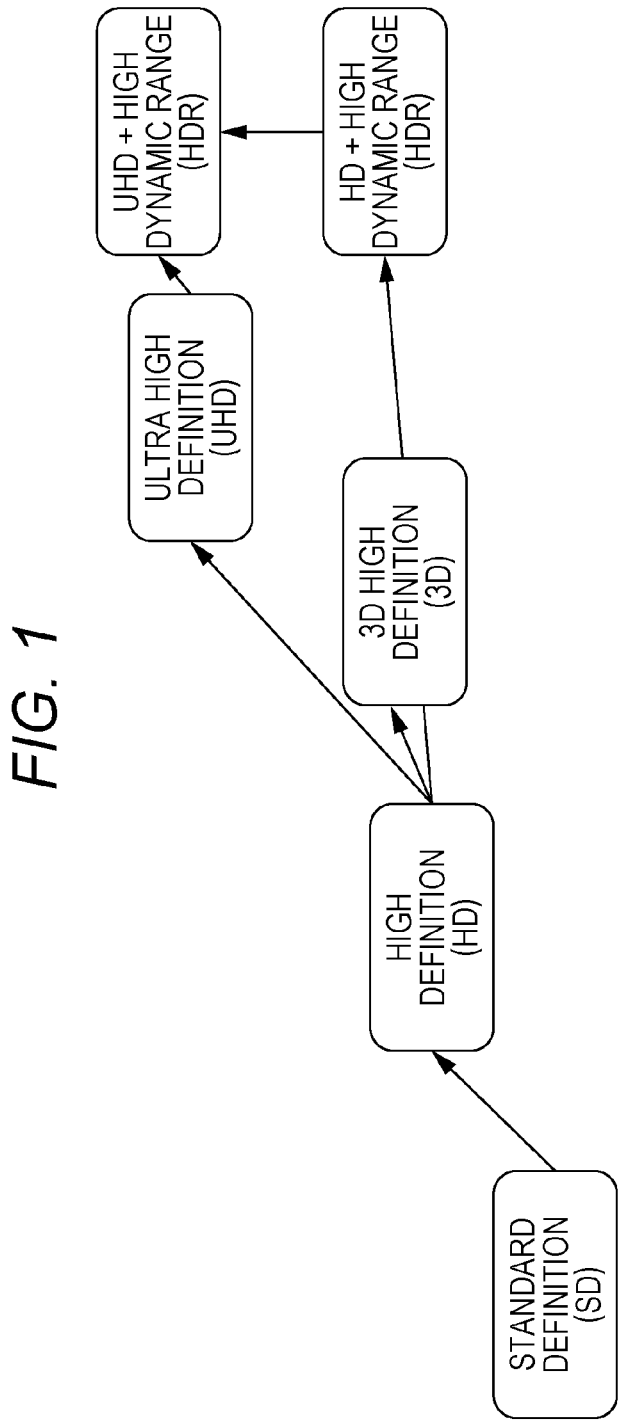
FIG. 1 is a diagram illustrating evolution of video techniques.

DETAILED DESCRIPTION (Underlying Knowledge Forming Basis of the Present Disclosure)

The inventor of the present disclosure has found out that the following problem occurs regarding the image signal processing apparatus described in the column of "BACKGROUND ART".

The image signal processing apparatus disclosed in Unexamined Japanese Patent Publication No. 2008-167418 calculates linear luminance for each pixel based on linear RGB values calculated from pixels that constitute a subject, calculates corrected linear luminance for each pixel and corrected linear RGB values of combined pixels obtained by combining a plurality of pixels that include the pixel based on the linear RGB values and the linear luminance, and then applies gamma correction to each of the corrected linear luminance and the corrected linear RGB values to calculate luminance for display and RGB values for display. Thus, the image signal processing apparatus achieves increase in a number of displayable gradations by correcting the linear luminance based on the corrected linear RGB values.

However, correction (conversion) of luminance in the image signal processing apparatus and the like disclosed in Unexamined Japanese Patent Publication No. 2008-167418 does not take into consideration a luminance conversion method for correcting (converting) luminance from a first luminance range to a second luminance range of which the luminance range is reduced.

In order to solve the above-described problem based on the above examination, the inventor of the present disclosure has examined the following improvement measure.

A conversion method according to one aspect of the present disclosure is a conversion method including: acquiring a first luminance signal indicating a first code value obtained by quantization of the luminance value of the video, the luminance value of the video being included in a first luminance range; and converting the first code value indicated by the acquired first luminance signal into a second luminance value compatible with a second luminance range, a maximum value of the second luminance range being determined based on a luminance range of the display apparatus, the maximum value of the second luminance range being smaller than a maximum value of the first luminance range, and the maximum value of the second luminance range being larger than 100 nit.

This allows appropriate conversion of the luminance in the first luminance range into luminance in the second luminance range with a reduced luminance range.

In addition, for example, the converting the first code value may include: by using an electro-optical transfer function (EOTF) that associates the luminance value in the first luminance range with a plurality of first code values, determining a first luminance value associated with the first code value indicated by acquired first luminance signal, the first luminance value being compatible with the first luminance range, I determining the second luminance value associated with the first luminance value in advance, the second luminance value being compatible with the second luminance range; and performing first luminance conversion to convert the first luminance value compatible with the first luminance range into the second luminance value compatible with the second luminance range.

In addition, for example, the maximum value of the second luminance range may be a maximum value of the luminance range of the display apparatus, and the performing the first luminance conversion may include, when the first luminance value is a first maximum luminance value that is a maximum value of the luminance values of a plurality of images that constitute the video, determining a second maximum luminance value that is the maximum value of the luminance of the display apparatus as the second luminance value.

In addition, for example, the performing the first luminance conversion may include: when the first luminance value is equal to or less than an average luminance value that is an average of the luminance values of the plurality of images that constitute the video, determining the first luminance value as the second luminance value; and when the first luminance value is equal to or greater than the first maximum luminance value, determining the second maximum luminance value as the second luminance value.

In addition, for example, the performing the first luminance conversion may include, when the first luminance value is between the average luminance value and the first maximum luminance value, determining the second luminance value corresponding to the first luminance value by using a natural logarithm.

Furthermore, for example, luminance information including at least one of the first maximum luminance value and an average luminance value that is an average of the luminance values of the plurality of images that constitute the video may be acquired as metadata information of the video.

Furthermore, for example, the first luminance signal may be acquired from a recording medium, and luminance information including at least one of the first maximum luminance value and an average luminance value that is an average of the luminance values of the plurality of images that constitute the video may be acquired via a network.

Furthermore, for example, luminance information corresponding to each of a plurality of scenes of the video may be further acquired, for each of the scenes, the luminance information including at least one of the first maximum luminance value that is a maximum value of the luminance values of the plurality of images that constitute each of the scenes, and an average luminance value that is an average of the luminance values of the plurality of images that constitute each of the scenes. Performing the first luminance conversion may include, for each of the plurality of scenes, determining the second luminance value according to the luminance information corresponding to each of the scenes.

Furthermore, for example, a third luminance value associated with the second luminance value in advance may be determined, the third luminance value being compatible with a third luminance range with a maximum value of 100 nit; second luminance conversion may be performed to convert the second luminance value compatible with the second luminance range into the third luminance value compatible with the third luminance range; the third luminance value may be quantized by using an inverse EOTF that associates a luminance value in the third luminance range with a plurality of second code values; the second code values obtained by the quantization may be determined; the third luminance value compatible with the third luminance range may be converted into the third luminance signal indicating the determined second code value; and the third luminance signal may be output to the display apparatus.

In addition, for example, the performing the second luminance conversion may include: determining a luminance value associated with the second luminance value as the third luminance value by using luminance-related information according to display characteristic information that is information indicating a display characteristic of the display apparatus; and switching luminance conversion processing according to the display characteristic information.

In addition, for example, the display characteristic information may be a display mode of the display apparatus, the performing the second luminance conversion may include: when the display mode is a normal mode, performing luminance conversion to convert the third luminance value into a direct proportion value in direct proportion to the second luminance value; and when the display mode is a dynamic mode in which a high-luminance pixel becomes brighter and a low-luminance pixel becomes darker than pixels in the normal mode, performing luminance conversion to convert the third luminance value of the low-luminance pixel into a value higher than the direct proportion value in direct proportion to the second luminance value, and to convert the third luminance value of the high-luminance pixel into a value lower than the direct proportion value in direct proportion to the second luminance value.

In addition, for example, the performing the first luminance conversion may include determining the second maximum luminance value by using display characteristic information that is information indicating a display characteristic of the display apparatus.

Furthermore, for example, the display characteristic information may be acquired from the display apparatus.

In addition, for example, the acquiring the display characteristic information may be performed immediately before the converting the code value.

In addition, for example, the acquiring the display characteristic information may be performed at timing of first connection with the display apparatus.

Note that these general or specific aspects may be implemented using an apparatus, a system, an integrated circuit, a computer program, or a computer-readable recording medium such as a CD-ROM, or may be implemented using any combination of a system, a method, an integrated circuit, a computer program, or a recording medium.

The display method and the display apparatus according to one aspect of the present disclosure will be specifically described below with reference to the accompanying drawings.

Exemplary embodiments described below indicate one specific example of the present disclosure. Numerical values, shapes, materials, dispositions and connection forms of the components, steps, order of the steps, and the like that are indicated in the following exemplary embodiments are one example, and do not intend to limit the present disclosure. Also, among the components described in the following exemplary embodiments, components that are not described in an independent claim which represents the highest concept are described as optional components.

Exemplary Embodiment

The present disclosure relates to an image conversion-playback method and apparatus for displaying a high dynamic range (HDR) signal, which is a high-luminance signal with a high luminance range, in a display apparatus, such as a TV, projector, tablet, and smart phone, the display apparatus supporting a standard dynamic range (SDR) signal, which is a normal luminance signal having a luminance range with a maximum luminance value of 100 nit.

[1-1. Background]

First, transition of video techniques will be described with reference to FIG. 1. FIG. 1 is a diagram illustrating evolution of the video techniques.

Until now, high definition of video has focused on increase in a number of display pixels. So-called 2K video is widely used, from 720×480-pixel Standard Definition (SD) video to 1920×1080-pixel High Definition (HD) video.

In recent years, introduction of so-called 4K video has started with a view toward higher definition of video, including 3840×1920-pixel Ultra High Definition (UHD) video and 4096×1920-pixel 4K video.

In addition to high resolution of video through introduction of 4K, consideration is given to high definition of video through extension of a dynamic range, enlargement of a color gamut, and addition or improvement of a frame rate.

Among those improvements, regarding the dynamic range, HDR (High Dynamic Range) attracts attention as a scheme that supports a luminance range with an extended maximum luminance value for representing bright light including specular reflection light that cannot be represented by current TV signals with brightness more similar to actual brightness while maintaining dark area gradation in conventional video. Specifically, while a scheme of the luminance range supported by conventional TV signals is referred to as SDR (Standard Dynamic Range) with the maximum luminance value of 100 nit, HDR is assumed to extend the maximum luminance value to 1,000 nit or more. Standardization of HDR is under way in organizations such as SMPTE (Society of Motion Picture & Television Engineers) and ITU-R (International Telecommunications Union Radiocommunications Sector).

Assumed specific application of HDR includes broadcast, package media (such as Blu-ray (registered trademark) disc), and Internet delivery, similarly to HD and UHD.

Hereinafter, in an HDR-enabled video, luminance of the video includes a luminance value within the luminance range of HDR. A luminance signal obtained through quantization of the luminance value of the video is referred to as an HDR signal. In an SDR-enabled video, luminance of the video includes a luminance value within the luminance range of SDR. A luminance signal obtained through quantization of the luminance value of the video is referred to as an SDR signal.

[1-2. Relationship Among Master Generation, Delivery Schemes, and Display Apparatuses]

Figure 2:
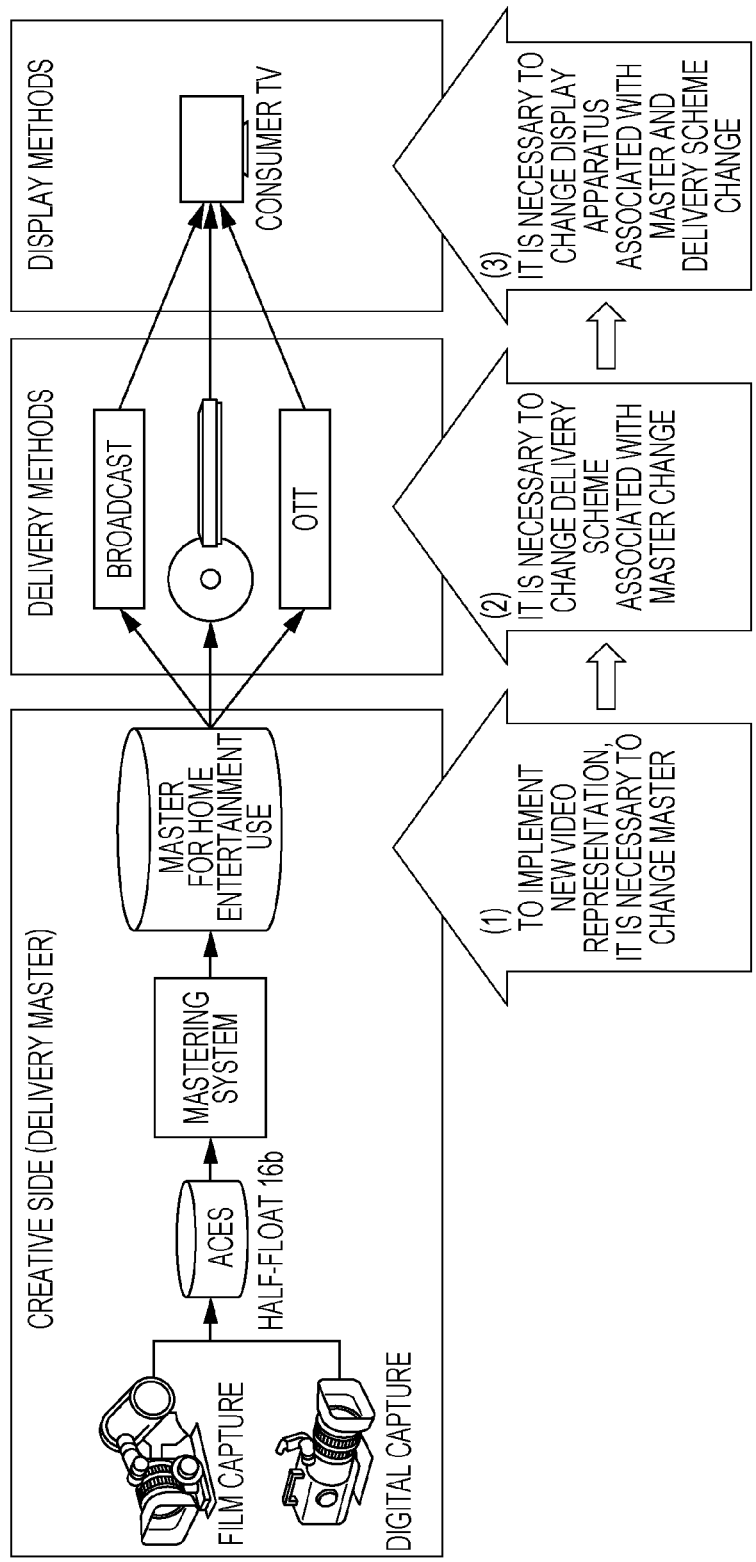
FIG. 2 is a diagram illustrating a relationship among video production, delivery schemes, and display apparatus in introduction of new video representation into content.

FIG. 2 is a diagram illustrating a relationship among video production, delivery schemes, and display apparatus in introduction of new video representation into content.

When new video representation (increase in a number of pixels or the like) is introduced for high definition of video, as illustrated in FIG. 2, it is necessary to (1) change a master for home entertainment use on a video production side. Accordingly, it is also necessary to (2) renew the delivery schemes, such as broadcast, communication, and package media, and to (3) renew the display apparatus, such as a TV, projector, and the like, that displays the video.

[1-3. Relationship Among Masters, Delivery Schemes, and Display Apparatuses in Introducing HDR]

In order that a user enjoys at home content that supports new video representation (for example, high-luminance video content (HDR content)), it is necessary to newly introduce both an HDR-enabled delivery scheme and an HDR-enabled display apparatus. That is, in order to enjoy at home the content that supports the new video representation, the user needs to prepare the delivery scheme and the display apparatus that support the new video representation. This is also unavoidable when new video representation is introduced, such as when video representation is changed from SD videos to HD videos, from HD videos to three-dimensional (3D) videos, and from HD videos to ultra high definition (UHD, 4K) videos.

For this reason, change to the new video representation, which needs replacement purchase of a TV which is expensive and does not allow easy replacement in terms of size, weight, etc., will be dependent on wider use of the display apparatus having new functions (for example, a TV). Since a medium side and content side are also unable to make large investment at first, the new video representation comes into wide use slowly in many cases.

Figure 3:
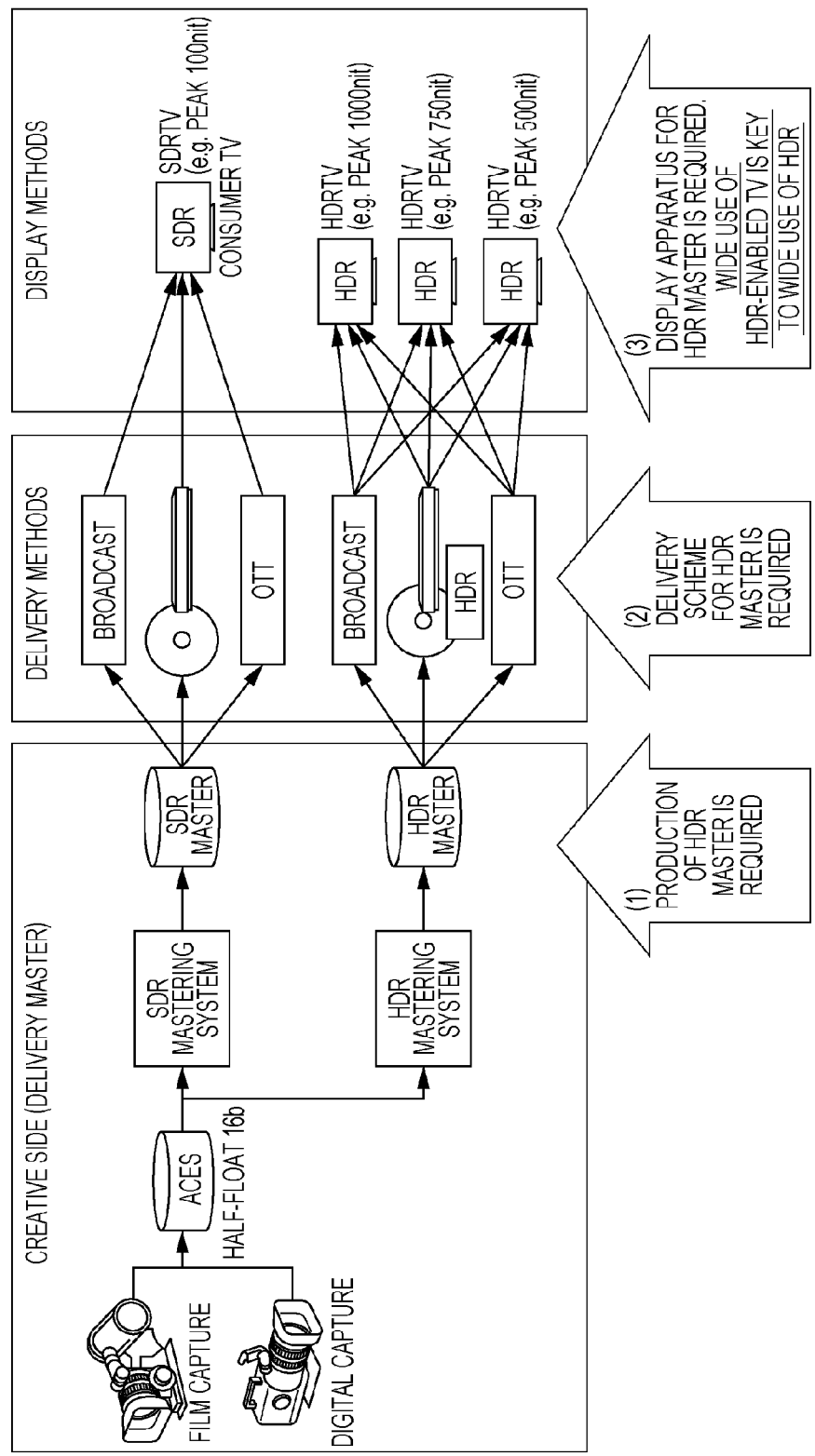
FIG. 3 is a diagram illustrating a relationship among masters, delivery schemes, and display apparatuses in introducing HDR.

Therefore, as illustrated in FIG. 3, regarding HDR as well, it is expected that replacement purchase of a TV (hereinafter referred to as "HDR TV") that supports HDR-enabled video display (hereinafter referred to as "HDR display") is required in order to take full advantage of original video representation of HDR.

[1-4. SDR TV]

A TV (hereinafter referred to as "SDR TV") that supports only display of an SDR-enabled video display (hereinafter referred to as "SDR display") normally receives an input signal with a luminance value of up to 100 nit. Accordingly, the SDR TV with display capability of 100 nit is sufficient for representing the luminance value of the input signal. However, many of the SDR TVs actually have a function of playing a video with an optimal luminance value adapted to viewing environments (dark room: cinema mode, bright room: dynamic mode, etc.), and have capability of video representation of 200 nit or more. That is, such an SDR TV can display a video with up to maximum luminance of display capability (for example, 300 nit) by selecting a display mode according to the viewing environment.

However, since a luminance upper limit of the SDR-scheme input signal that is input into the SDR TV is determined as 100 nit, as long as a conventional SDR-scheme input interface is used, it is difficult to use high-luminance video playback capability of the SDR TV exceeding 100 nit for playback of the HDR signal (refer to FIG. 4A and FIG. 4B).

[1-5. HDR to SDR Conversion]

It is assumed that high-luminance video content (hereinafter referred to as "HDR content" or "HDR video") is output from the SDR TV via an HDR-enabled playback apparatus (for example, communication set top box (STB), Blu-ray device, IPTV playback apparatus), the high-luminance video content being delivered by delivery schemes such as HDR-enabled broadcast, video delivery via communication networks, or HDR-enabled package media (for example, HDR-enabled Blu-ray disc). When the SDR TV plays the HDR content, "HDR to SDR conversion" is implemented for converting the HDR-enabled HDR signal into the SDR signal in the SDR luminance range with a maximum value of 100 nit such that the SDR TV can display the video correctly. This allows the SDR TV to display the SDR video obtained by conversion from the HDR video by using the converted SDR signal (refer to FIG. 5).

However, even in this case, although the user has purchased the HDR-enabled content (for example, Blu-ray disc, HDR IPTV content) and HDR-enabled playback apparatus (for example, Blu-ray device, HDR-enabled IPTV playback apparatus), the user can enjoy a video only in SDR video representation (SDR representation) on the SDR TV. That is, even if the HDR content and HDR-enabled playback apparatus are prepared, when there is no HDR-enabled display apparatus (for example, HDR TV) and there is only the SDR TV, the user cannot view the video in HDR video representation (HDR representation).

Therefore, if the user cannot prepare the HDR TV, even if the user purchases the HDR content or transmission media (playback apparatus), the user does not understand values of HDR (that is, superiority of high definition HDR over SDR). Thus, since the user does not understand the values of HDR without the HDR TV, wide use of the HDR content or HDR-enabled delivery scheme is decided depending on a speed at which HDR TVs come into wide use.

[1-6. Two Schemes of Implementing HDR to SDR Conversion]

Figure 6A:
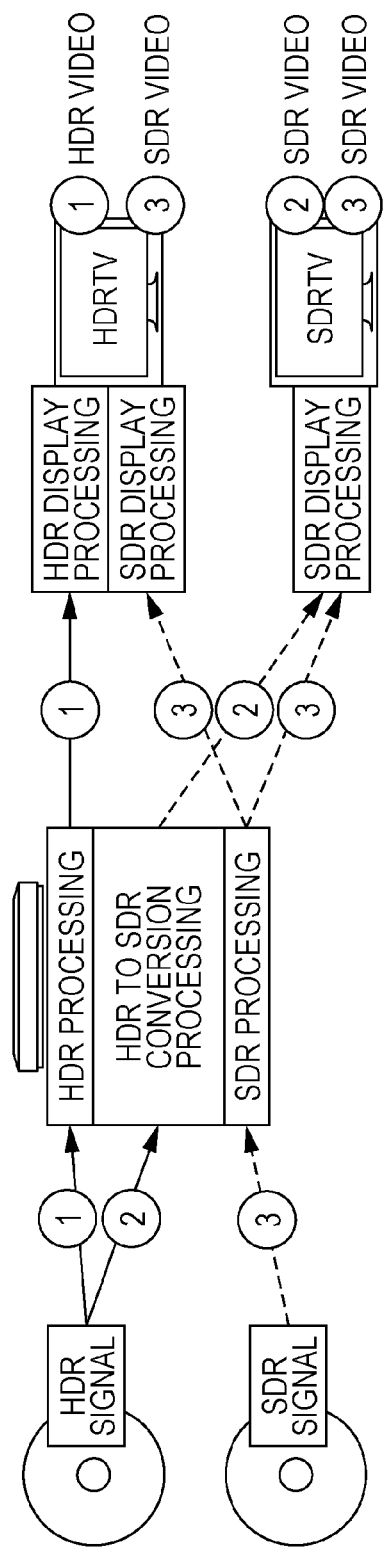
FIG. 6A is a diagram illustrating case 1 where an HDR disc stores only an HDR-enabled HDR signal.

When the HDR signal is sent to a TV by using a Blu-ray disc (BD), the following two cases can be assumed as illustrated in FIG. 6A and FIG. 6B. FIG. 6A is a diagram illustrating case 1 where an HDR-enabled BD stores only an HDR-enabled HDR signal. FIG. 6B is a diagram illustrating case 2 where an HDR-enabled BD stores an HDR-enabled HDR signal and an SDR-enabled SDR signal.

As illustrated in FIG. 6A, in case 1 where the HDR TV displays a video obtained by the Blu-ray device playing a BD, the Blu-ray device outputs a luminance signal stored in the BD to the HDR TV as it is without conversion, regardless of whether the Blu-ray device plays the HDR-enabled BD (hereinafter referred to as "HDR BD") or SDR-enabled BD (hereinafter referred to as "SDR BD"). Then, the HDR TV, which can perform display processing of both the HDR signal and the SDR signal, performs display processing in accordance with the input luminance signal, and displays the HDR video or SDR video.

On the other hand, in case 1 where the SDR TV displays a video obtained by the Blu-ray device playing a BD, when the HDR BD is played, the Blu-ray device performs conversion processing to convert the HDR signal into the SDR signal, and then outputs the SDR signal obtained by the conversion processing to the SDR TV. Meanwhile, when the SDR BD is played, the Blu-ray device outputs the SDR signal stored in the BD to the SDR TV as it is without conversion. Accordingly, the SDR TV displays the SDR video.

In addition, as illustrated in FIG. 6B, case 2 where the HDR TV displays the video obtained by the Blu-ray device playing the BD is similar to case 1.

On the other hand, in case 2 where the SDR TV displays a video obtained by the Blu-ray device playing the BD, the Blu-ray device outputs the SDR signal stored in the BD to the SDR TV as it is without conversion, regardless of whether the Blu-ray device plays the HDR BD or the SDR BD.

In both case 1 and case 2, even if the user purchases the HDR BD and the HDR-enabled Blu-ray device, the user can enjoy only the SDR video without the HDR TV. Therefore, the user needs the HDR TV in order to view the HDR video, and it is estimated that wide use of HDR-enabled Blu-ray device or HDR BD takes time.

[1-7. HDR to Pseudo HDR Conversion]

Figure 7:
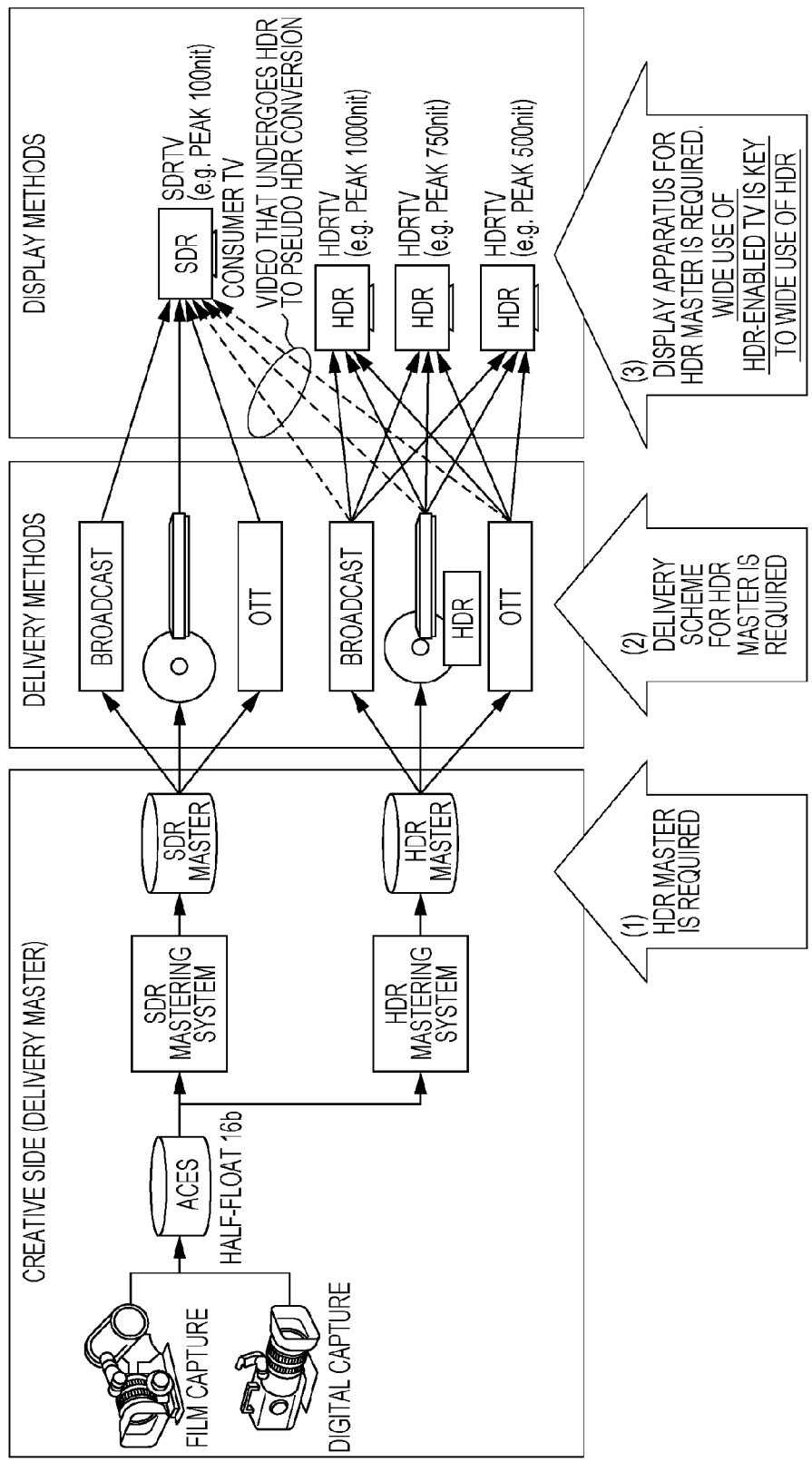
FIG. 7 is a diagram illustrating conversion processing from HDR to pseudo HDR.

Accordingly, in order to accelerate wide use of HDR, it may be said to be important that commercialization of HDR content and delivery scheme can be promoted without waiting for wide use of the HDR TV. For this purpose, if it is possible to enable viewing of the HDR signal on the existing SDR TV, not as the SDR video but as the HDR video or pseudo HDR video that is more similar to the HDR video than to the SDR video, the user can view the higher definition video similar to the HDR video apparently different from the SDR video, without purchasing the HDR TV. That is, if the user can view the pseudo HDR video on the SDR TV, only by preparing the HDR content and HDR delivery device, the user can view the video with higher definition than that of the SDR video without preparing the HDR TV. In short, enabling viewing of the pseudo HDR video on the SDR TV can become motivation of the user to purchase the HDR content or HDR delivery device (refer to FIG. 7).

In order to implement display of the pseudo HDR video on the SDR TV, it is necessary to implement "HDR to pseudo HDR conversion processing" that makes it possible to generate the pseudo HDR signal for displaying the video with maximum luminance of display capability of the SDR TV, for example, the video of 200 nit or more and to send the generated pseudo HDR signal to the SDR TV, by using input of the video signal with a maximum value of 100 nit into the SDR TV instead of conversion of the HDR signal into the SDR video signal so that the SDR TV can correctly display the video of the HDR content when the HDR content is played with a configuration in which the SDR TV is connected to the HDR delivery scheme.

[1-8. About EOTF]

Here, EOTF will be described with reference to FIG. 8A and FIG. 8B.

FIG. 8A is a diagram illustrating an example of an electro-optical transfer function (EOTF) that supports each of HDR and SDR.

EOTF is commonly called a gamma curve, indicates correspondence between a code value and a luminance value, and converts the code value into the luminance value. That is, EOTF is correspondence information that indicates the correspondence between a plurality of code values and the luminance value.

Figure 8B:
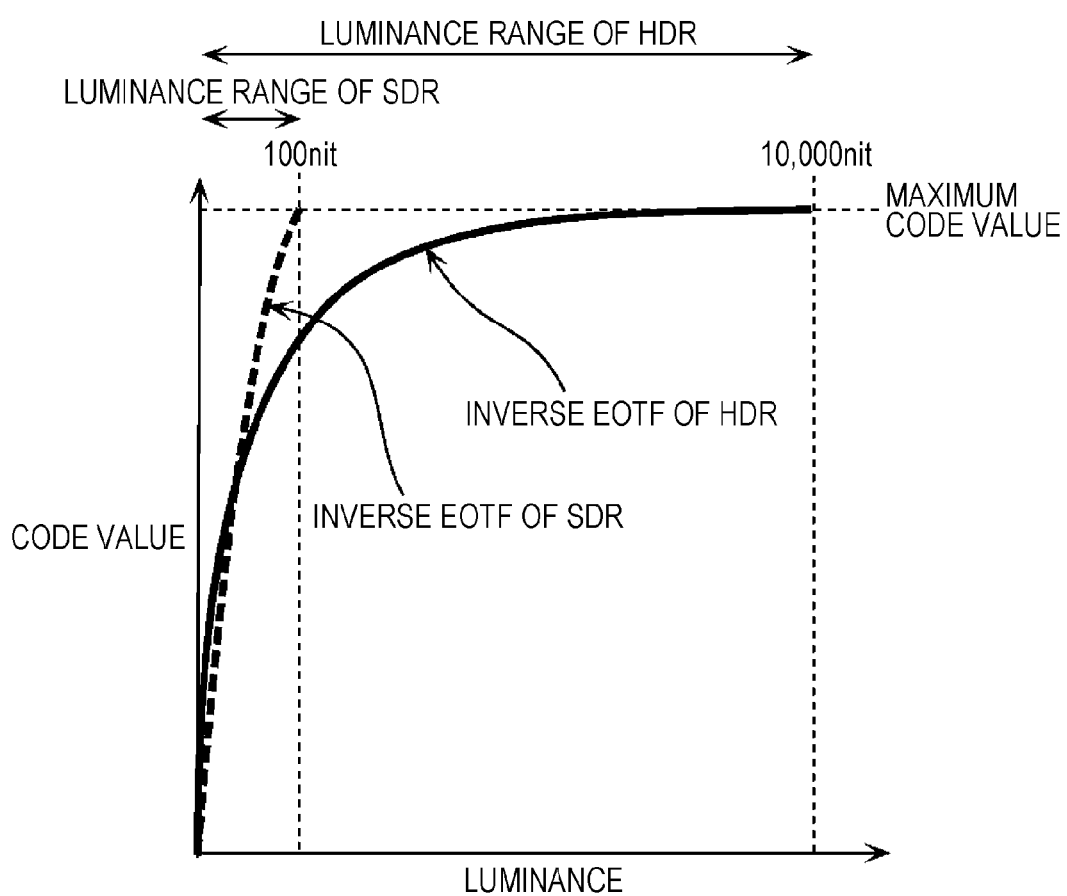
FIG. 8B is a diagram illustrating an example of inverse EOTF that supports each of HDR and SDR.

FIG. 8B is a diagram illustrating an example of inverse EOTF that supports each of HDR and SDR.

Inverse EOTF indicates correspondence between the luminance value and the code value, and quantizes and converts the luminance value into the code value, inversely to EOTF. That is, inverse EOTF is correspondence information that indicates the correspondence between the luminance value and the plurality of code values. For example, in a case of representing a luminance value of an HDR-enabled video with a code value of 10-bit gradation, the luminance value in the luminance range of HDR of up to 10,000 nit is quantized and mapped to 1024 integral values from 0 to 1023. That is, the luminance value (luminance value of the HDR-enabled video) in the luminance range of up to 10,000 nit is converted into the HDR signal of a 10-bit code value by quantization based on inverse EOTF. In HDR-enabled EOTF (hereinafter referred to as "EOTF of HDR") or HDR-enabled inverse EOTF (hereinafter referred to as "inverse EOTF of HDR"), it is possible to represent the luminance value higher than the luminance value in SDR-enabled EOTF (hereinafter referred to as "EOTF of SDR") or SDR-enabled inverse EOTF (hereinafter referred to as "inverse EOTF of SDR"). For example, in FIG. 8A and FIG. 8B, the maximum value of luminance (peak luminance) is 10,000 nit. That is, the luminance range of HDR includes the entire luminance range of SDR, and the peak luminance of HDR is larger than the peak luminance of SDR. The luminance range of HDR is the luminance range with the maximum value enlarged from 100 nit, which is the maximum value of the luminance range of SDR, to 10,000 nit.

For example, one example of EOTF of HDR and inverse EOTF of HDR is SMPTE 2084 standardized by the United States Society of Motion Picture and Television Engineers (SMPTE).

[1-9. How to Use EOTF]

Figure 9:
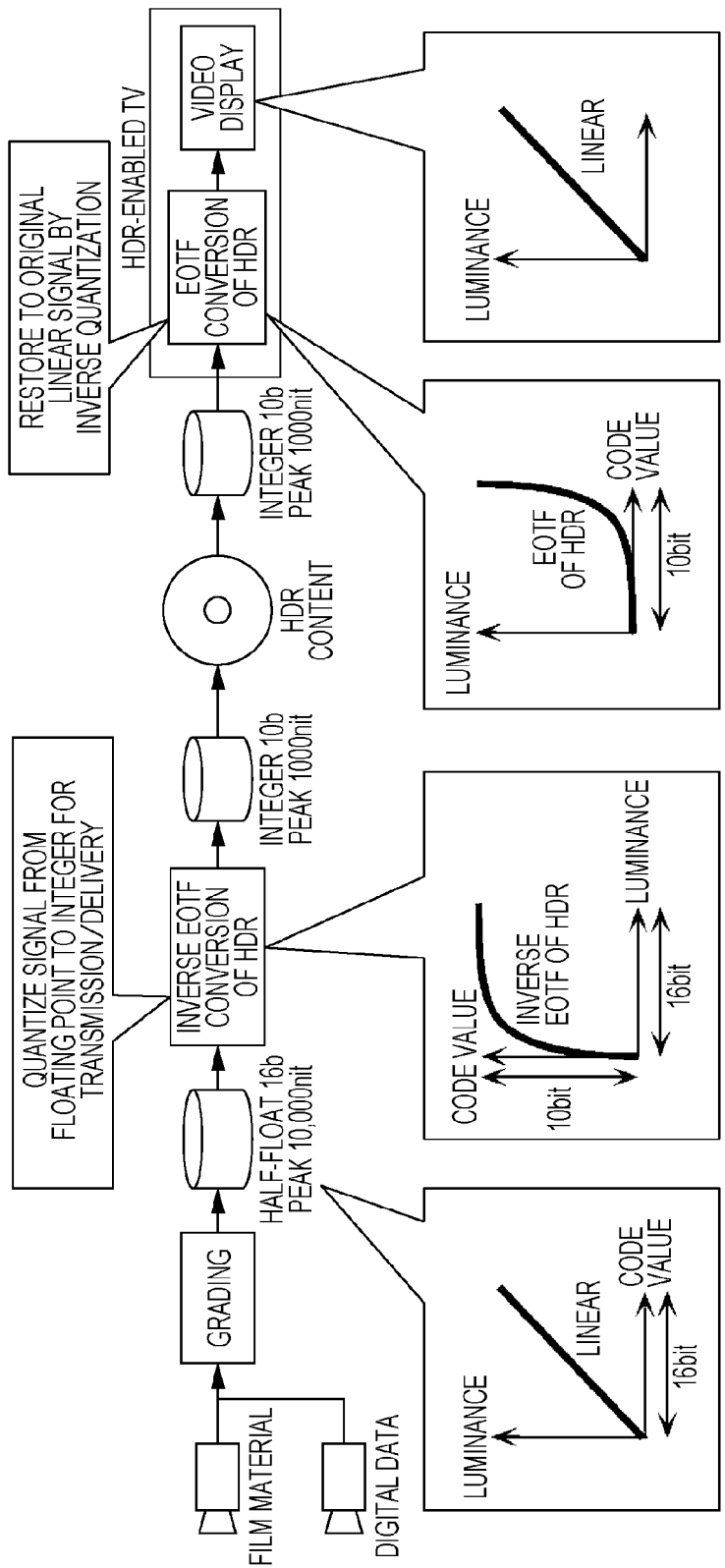
FIG. 9 is an illustrative diagram of a determination method of a code value of a luminance signal to be stored in content, and a process of restoring a luminance value from the code value during playback.

FIG. 9 is an illustrative diagram of a determination method of a code value of the luminance signal to be stored in content, and a process of restoring the luminance value from the code value during playback.

The luminance signal indicating luminance in this example is an HDR-enabled HDR signal. An image after grading is quantized by inverse EOTF of HDR, and the code value corresponding to the luminance value of the image is determined. Processing such as image coding is performed based on this code value, and a video stream is generated. During playback, a decoding result of the stream is converted into a linear signal through inverse quantization based on EOTF of HDR, and the luminance value for each pixel is restored. Hereinafter, quantization of HDR using inverse EOTF is referred to as "inverse EOTF conversion of HDR". Inverse quantization of HDR using EOTF is referred to as "EOTF conversion of HDR". Similarly, quantization of SDR using inverse EOTF is referred to as "inverse EOTF conversion of SDR". Inverse quantization of SDR using EOTF is referred to as "EOTF conversion of SDR".

[1-10. Necessity for Pseudo HDR]

Next, necessity for pseudo HDR will be described with reference to FIG. 10A to FIG. 10C.

Figure 10A:
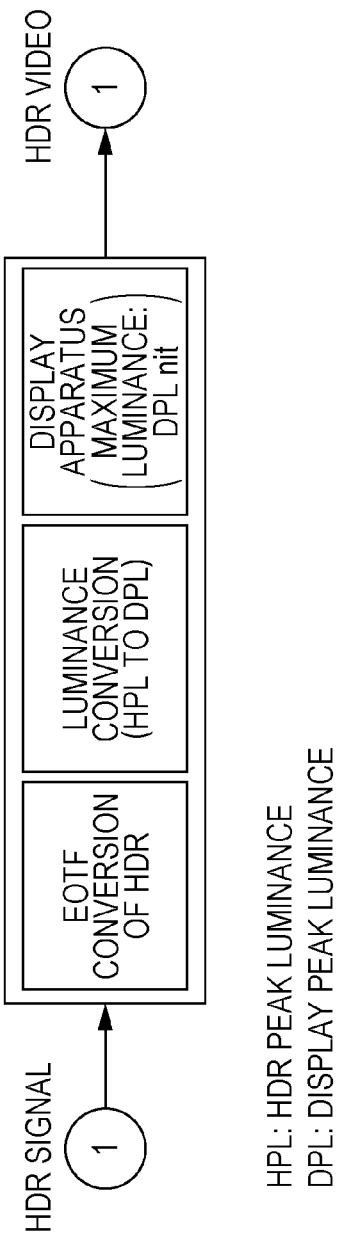
FIG. 10A is a diagram illustrating one example of display processing to convert an HDR signal and to perform HDR display within an HDR TV.

FIG. 10A is a diagram illustrating an example of display processing for converting an HDR signal and performing HDR display within an HDR TV.

As illustrated in FIG. 10A, in displaying an HDR video, a maximum value of the luminance range of HDR (peak luminance (HPL (HDR Peak Luminance): example 1500 nit)) may not be displayed as it is even if the display apparatus is an HDR TV. In this case, luminance conversion is performed to adapt a linear signal after inverse quantization using EOTF of HDR to a maximum value of the luminance range of the display apparatus (peak luminance (DPL (Display Peak luminance): example 750 nit)). Then, inputting a video signal obtained through the luminance conversion into the display apparatus allows for displaying the HDR video adapted to the maximum luminance range which is a limit of the display apparatus.

Figure 10B:
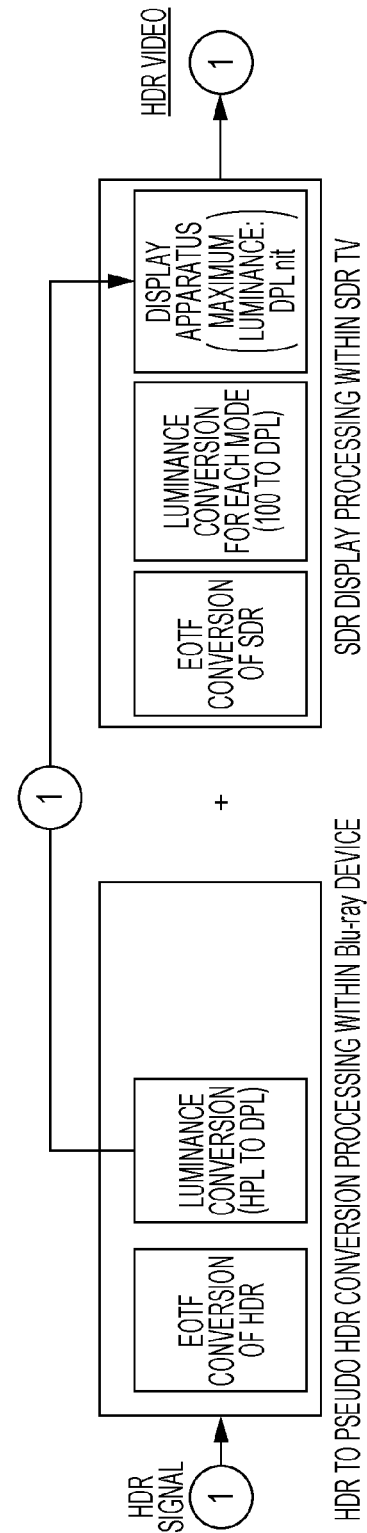
FIG. 10B is a diagram illustrating one example of display processing to perform HDR display using an HDR-enabled playback apparatus and the SDR TV.

FIG. 10B is a diagram illustrating an example of display processing for performing HDR display by using an HDR-enabled playback apparatus and SDR TV.

As illustrated in FIG. 10B, in displaying the HDR video, when the display apparatus is an SDR TV, by making use of the fact that the maximum value of the luminance range of the SDR TV for display (peak luminance (DPL: example 300 nit)) exceeds 100 nit, "EOTF conversion of HDR" performed in the HDR TV and "luminance conversion" using DPL (example: 300 nit), which is the maximum value of the luminance range of the SDR TV, are performed in the "HDR to pseudo HDR conversion processing" within the HDR-enabled playback apparatus (Blu-ray device) of FIG. 10B. If a signal obtained by performing the "luminance conversion" can be input directly into the "display apparatus" of the SDR TV, an effect identical to the effect of the HDR TV can be achieved even if the SDR TV is used.

However, this cannot be achieved because the SDR TV does not have means for performing direct input of such a signal from outside.

FIG. 10C is a diagram illustrating an example of display processing for performing HDR display using the HDR-enabled playback apparatus and SDR TV connected to each other via a standard interface.

As illustrated in FIG. 10C, it is necessary to input into the SDR TV a signal that provides the effect of FIG. 10B by using an input interface usually included in the SDR TV (such as HDMI (registered trademark)). In the SDR TV, the signal that is input via the input interface passes through "EOTF conversion of SDR", "luminance conversion for each mode", and "display apparatus" sequentially, and displays a video adapted to the maximum luminance range value of the display apparatus. Therefore, within the HDR-enabled Blu-ray device, a signal (pseudo HDR signal) is generated for cancelling "EOTF conversion of SDR" and "luminance conversion for each mode" through which the signal passes immediately after the input interface in the SDR TV. That is, within the HDR-enabled Blu-ray device, by performing "inverse luminance conversion for each mode", and "inverse EOTF conversion of SDR" immediately after "EOTF conversion of HDR" and "luminance conversion" using the peak luminance (DPL) of the SDR TV, a pseudo effect identical to the effect in a case where a signal immediately after the "luminance conversion" is input into the "display apparatus" (dashed arrow of FIG. 10C) is achieved.

[1-11. Conversion Apparatus and Display Apparatus]

Figure 11:
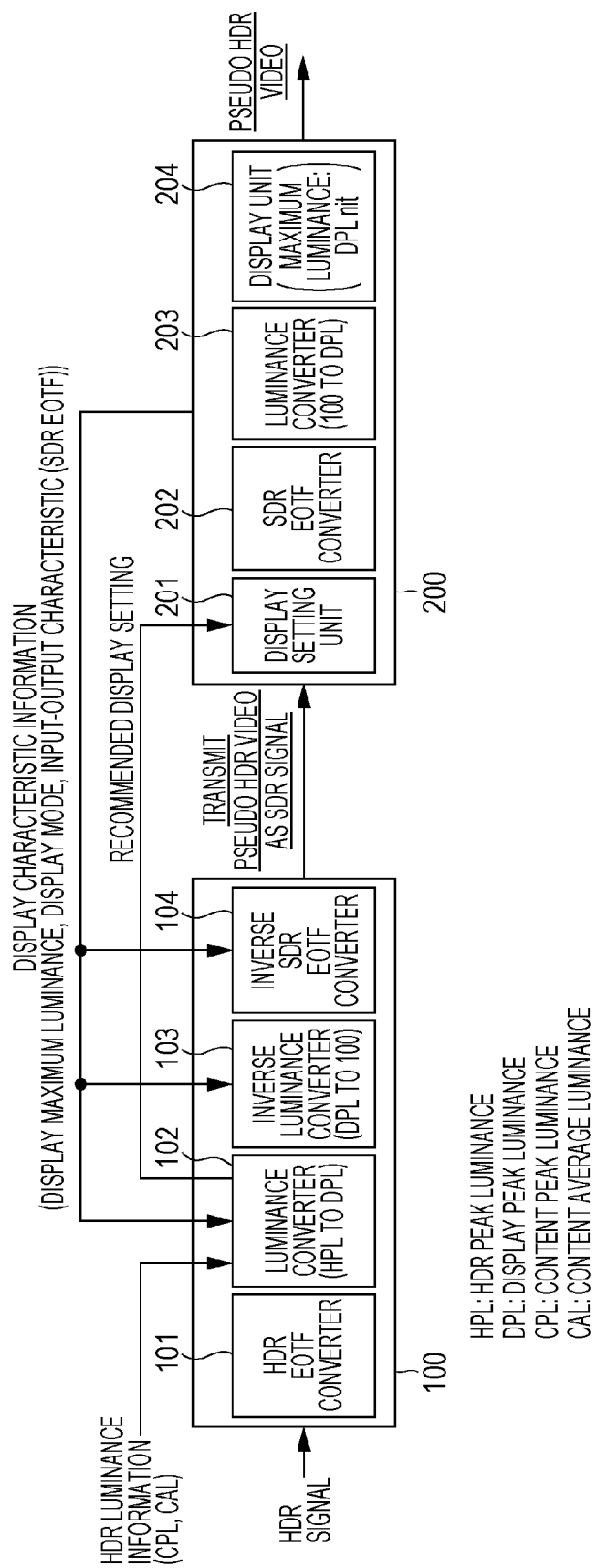
FIG. 11 is a block diagram illustrating a configuration of a conversion apparatus and a display apparatus according to an exemplary embodiment.

FIG. 11 is a block diagram illustrating a configuration of the conversion apparatus and display apparatus according to the exemplary embodiment. FIG. 12 is a flowchart illustrating the conversion method and display method to be performed by the conversion apparatus and display apparatus according to the exemplary embodiment.

As illustrated in FIG. 11, conversion apparatus 100 includes HDR EOTF converter 101, luminance converter 102, inverse luminance converter 103, and inverse SDR EOTF converter 104. Display apparatus 200 includes display setting unit 201, SDR EOTF converter 202, luminance converter 203, and display unit 204.

Detailed description of each component of conversion apparatus 100 and display apparatus 200 will be made in description of the conversion method and the display method.

Hereinafter, the luminance range of HDR (0 to HPL [nit]) is referred to as "first luminance range". The luminance range of a display (0 to DPL [nit]) is referred to as "second luminance range". The luminance range of SDR (0 to 100 [nit]) is referred to as "third luminance range".

[1-12. Conversion Method and Display Method]

The conversion method to be performed by conversion apparatus 100 will be described with reference to FIG. 12. Note that the conversion method includes step S101 to step S104 described below.

First, HDR EOTF converter 101 of conversion apparatus 100 acquires the HDR video on which inverse EOTF conversion of HDR is performed. HDR EOTF converter 101 of conversion apparatus 100 performs EOTF conversion of HDR on the HDR signal of the acquired HDR video (S101). Accordingly, HDR EOTF converter 101 converts the acquired HDR signal into a linear signal that indicates the luminance value. An example of EOTF of HDR is SMPTE 2084.

Next, luminance converter 102 of conversion apparatus 100 performs first luminance conversion that converts the linear signal converted by HDR EOTF converter 101 by using display characteristic information and content luminance information (S102). In the first luminance conversion, the luminance value compatible with the luminance range of HDR (hereinafter referred to as "luminance value of HDR"), which is the first luminance range, is converted into the luminance value compatible with the luminance range of the display (hereinafter referred to as "display luminance value"), which is the second luminance range. Details will be described later.

From the aforementioned description, HDR EOTF converter 101 functions as an acquisition unit that acquires the HDR signal as a first luminance signal indicating the code value obtained by quantization of the luminance value of a video. In addition, HDR EOTF converter 101 and luminance converter 102 function as a converter that converts the code value indicated by the HDR signal acquired by the acquisition unit into the display luminance value compatible with the luminance range of the display determined based on the luminance range of the display (display apparatus 200), which is a maximum value (DPL) smaller than a maximum value (HPL) of the luminance range of HDR and larger than 100 nit.

More specifically, in step S101, HDR EOTF converter 101 uses the acquired HDR signal and EOTF of HDR to determine the luminance value of HDR associated with the code value of HDR by EOTF of HDR, the code value of HDR being a first code value indicated by the acquired HDR signal. Note that the HDR signal indicates the code value of HDR obtained by quantization of the luminance value of a video (content) by using inverse EOTF of HDR that associates the luminance value in the luminance range of HDR with the plurality of HDR code values.

In step S102, regarding the luminance value of HDR determined in step S101, luminance converter 102 performs the first luminance conversion that determines the display luminance value compatible with the luminance range of the display associated with the luminance value of HDR in advance, and converts the luminance value of HDR compatible with the HDR luminance range into the display luminance value compatible with the luminance range of the display.

Before step S102, conversion apparatus 100 acquires content luminance information including at least one of a maximum value of luminance (CPL: Content Peak luminance) of a video (content) and an average luminance value (CAL: Content Average luminance) of a video as information regarding the HDR signal. CPL (first maximum luminance value) is, for example, a maximum value of the luminance values of a plurality of images that constitute the HDR video. CAL is, for example, an average luminance value which is an average of the luminance values of the plurality of images that constitute the HDR video.

In addition, before step S102, conversion apparatus 100 acquires the display characteristic information on display apparatus 200 from display apparatus 200. Note that the display characteristic information is information indicating the display characteristic of display apparatus 200, such as a maximum value of luminance that display apparatus 200 can display (DPL), display mode (refer to later description) of display apparatus 200, and input-output characteristic (EOTF supported by the display apparatus).

In addition, conversion apparatus 100 may transmit recommended display setting information (refer to later description, and hereinafter sometimes referred to as "setting information") to display apparatus 200.

Next, inverse luminance converter 103 of conversion apparatus 100 performs inverse luminance conversion according to the display mode of display apparatus 200. Accordingly, inverse luminance converter 103 performs second luminance conversion that converts the luminance value compatible with the luminance range of the display, which is the second luminance range, into the luminance value compatible with the luminance range of SDR, which is the third luminance range (S103). Details will be described later. That is, regarding the display luminance value obtained in step S102, inverse luminance converter 103 performs the second luminance conversion that determines the luminance value compatible with SDR (hereinafter referred to as "SDR luminance value") as a third luminance value compatible with the luminance range of SDR with the maximum value of 100 nit associated with the display luminance value in advance, and converts the display luminance value compatible with the luminance range of the display into the SDR luminance value compatible with the luminance range of SDR.

Then, inverse SDR EOTF converter 104 of conversion apparatus 100 performs inverse SDR EOTF conversion to generate the pseudo HDR video (S104). That is, inverse SDR EOTF converter 104 uses inverse EOTF (Electro-Optical Transfer Function) of SDR (Standard Dynamic Range), which is third correspondence information that associates the luminance value in the luminance range of HDR with a plurality of third code values, to quantize the determined luminance value of SDR, determines the third code value obtained by quantization, and converts the luminance value of SDR compatible with the luminance range of SDR into the SDR signal as a third luminance signal indicating the third code value, thereby generating the pseudo HDR signal. Here, each of the third code values is a code value compatible with SDR, and hereinafter referred to as "code value of SDR". That is, the SDR signal is expressed by the code value of SDR obtained by quantization of the luminance value of a video by using inverse EOTF of SDR that associates the luminance value in the luminance range of SDR with the plurality of code values of SDR. Then, conversion apparatus 100 outputs the pseudo HDR signal (SDR signal) generated in step S104 to display apparatus 200.

Conversion apparatus 100 performs the first luminance conversion and the second luminance conversion on the luminance value of HDR obtained by performing inverse quantization on the HDR signal to generate the luminance value of SDR compatible with pseudo HDR. Conversion apparatus 100 quantizes the luminance value of SDR by using EOTF of SDR to generate the SDR signal compatible with pseudo HDR. Although the luminance value of SDR is a numerical value within the luminance range of 0 to 100 nit compatible with SDR, since conversion based on the luminance range of the display is performed, the luminance value of SDR is a numerical value different from the luminance value within the luminance range of 0 to 100 nit compatible with SDR obtained by performing the luminance conversion using EOTF of HDR and EOTF of SDR on the luminance value of HDR.

Next, the display method to be performed by display apparatus 200 will be described with reference to FIG. 12. Note that the display method includes step S105 to step S108 described below.

First, display setting unit 201 of display apparatus 200 uses the setting information acquired from conversion apparatus 100 to set display settings of display apparatus 200 (S105). Here, display apparatus 200 is the SDR TV. The setting information is information indicating display settings recommended to the display apparatus, and is information indicating how to perform EOTF on the pseudo HDR video and which display settings to use for displaying a beautiful video (that is, information for switching the display settings of display apparatus 200 to optimal display settings). The setting information includes, for example, a gamma curve characteristic of output in the display apparatus, display modes such as a living mode (normal mode) and dynamic mode, and a numerical value of a back light (brightness). In addition, a message may be displayed on display apparatus 200 for prompting the user to change the display settings of display apparatus 200 (hereinafter sometimes referred to as "SDR display") by manual operation. Details will be described later.

Note that, before step S105, display apparatus 200 acquires the SDR signal (pseudo HDR signal) and the setting information indicating the display settings recommended to display apparatus 200 in displaying a video.

Display apparatus 200 only needs to acquire the SDR signal (pseudo HDR signal) before step S106, and may acquire the SDR signal after step S105.

Next, SDR EOTF converter 202 of display apparatus 200 performs EOTF conversion of SDR on the acquired pseudo HDR signal (S106). That is, SDR EOTF converter 202 performs inverse quantization on the SDR signal (pseudo HDR signal) by using EOTF of SDR. Accordingly, SDR EOTF converter 202 converts the code value of SDR indicated by the SDR signal into the luminance value of SDR.

Then, luminance converter 203 of display apparatus 200 performs the luminance conversion according to the display mode that is set for display apparatus 200. Accordingly, luminance converter 203 performs third luminance conversion that converts the luminance value of SDR compatible with the luminance range of SDR (0 to 100 [nit]) into the display luminance value compatible with the luminance range of the display (0 to DPL [nit]) (S107). Details will be described later.

As described above, in step S106 and step S107, display apparatus 200 converts the third code value indicated by the acquired SDR signal (pseudo HDR signal) into the display luminance value compatible with the luminance range of the display (0 to DPL [nit]) by using the setting information acquired in step S105.

More specifically, in the conversion from the SDR signal (pseudo HDR signal) into the display luminance value, in step S106, by using EOTF that associates the luminance value in the luminance range of SDR with the plurality of third code values, display apparatus 200 determines the luminance value of SDR associated with the code value of SDR indicated by the acquired SDR signal by EOTF of SDR.

Then, in the conversion into the display luminance value, in step S107, display apparatus 200 performs the third luminance conversion that determines the display luminance value compatible with the luminance range of the display associated in advance with the determined luminance value of SDR, and converts the luminance value of SDR compatible with the luminance range of SDR into the display luminance value compatible with the luminance range of the display.

Finally, display unit 204 of display apparatus 200 displays the pseudo HDR video on display apparatus 200 based on the converted display luminance value (S108).

[1-13. First Luminance Conversion]

Figure 13A:
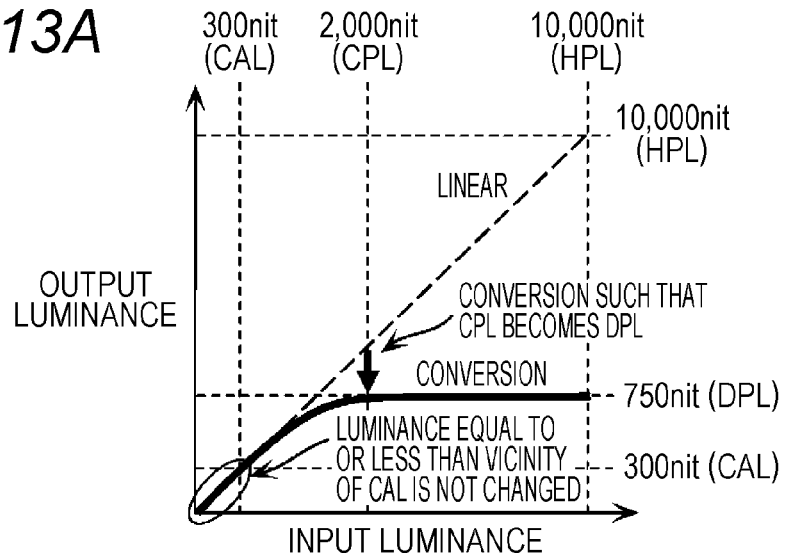
FIG. 13A is a diagram illustrating first luminance conversion.

Next, details of the first luminance conversion (HPL to DPL) of step S102 will be described with reference to FIG. 13A. FIG. 13A is a diagram illustrating an example of the first luminance conversion.

Luminance converter 102 of conversion apparatus 100 performs the first luminance conversion of converting the linear signal (luminance value of HDR) obtained in step S101 by using the display characteristic information and the content luminance information on the HDR video. The first luminance conversion converts the luminance value of HDR (input luminance value) into the display luminance value (output luminance value) that does not exceed the display peak luminance (DPL). DPL is determined using the maximum luminance of the SDR display and the display mode which are the display characteristic information. The display mode is, for example, mode information including a theater mode of relatively dark display on the SDR display and a dynamic mode of relatively bright display. When the display mode is, for example, a mode in which the maximum luminance of the SDR display is 1,500 nit, and the display mode is a mode in which brightness is set to 50% of the maximum luminance, DPL will be 750 nit. Here, DPL (second maximum luminance value) is a maximum value of luminance the SDR display can display in the display mode of current setting. That is, in the first luminance conversion, DPL as the second maximum luminance value is determined by using the display characteristic information which is information indicating the display characteristic of the SDR display.

In addition, in the first luminance conversion, CAL and CPL out of the content luminance information are used. The luminance value equal to or less than vicinity of CAL is identical between before and after the conversion, and only the luminance value equal to or greater than vicinity of CPL is changed. That is, as illustrated in FIG. 13A, in the first luminance conversion, when the luminance value of HDR is equal to or less than CAL, the luminance value of HDR is not converted, and the luminance value of HDR is determined as the display luminance value. When the luminance value of HDR is equal to or greater than CPL, DPL as the second maximum luminance value is determined as the display luminance value.

In addition, in the first luminance conversion, out of the luminance information, the peak luminance of the HDR video (CPL) is used. When the luminance value of HDR is CPL, DPL is determined as the display luminance value.

Figure 13B:
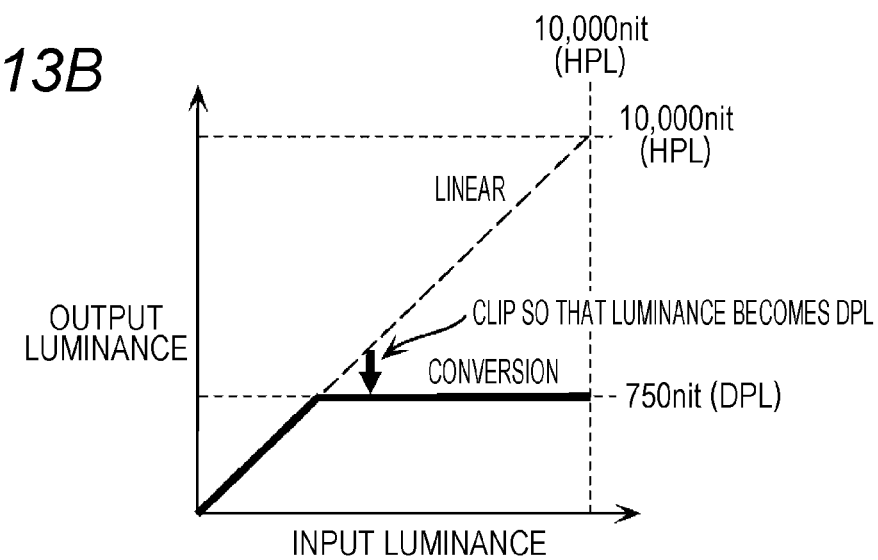
FIG. 13B is a diagram illustrating another example of the first luminance conversion.

Note that, in the first luminance conversion, as illustrated in FIG. 13B, conversion may be performed so that the linear signal (luminance value of HDR) obtained in step S101 may be clipped to a value that does not exceed DPL. Such luminance conversion can simplify processing performed by conversion apparatus 100, and can achieve size reduction, low power consumption, and high-speed processing of the apparatus. Note that FIG. 13B is a diagram illustrating another example of the first luminance conversion.

[1-14. Second Luminance Conversion]

Figure 14:
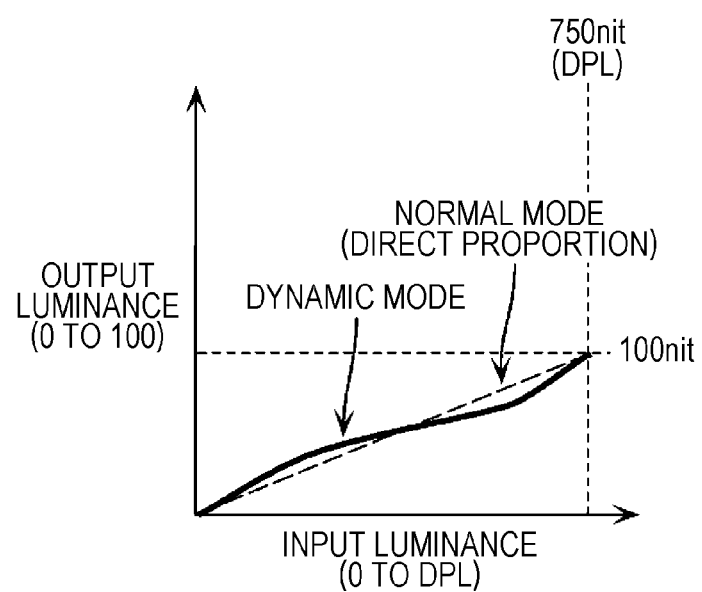
FIG. 14 is a diagram illustrating second luminance conversion.

Next, details of the second luminance conversion of step S103 (DPL to 100 [nit]) will be described with reference to FIG. 14. FIG. 14 is a diagram illustrating the second luminance conversion.

Inverse luminance converter 103 of conversion apparatus 100 applies inverse luminance conversion according to the display mode to the display luminance value in the luminance range of the display converted in the first luminance conversion of step S102 (0 to DPL [nit]). The inverse luminance conversion is processing for acquiring the display luminance value in the luminance range of the display after processing of step S102 (0 to DPL [nit]) when the luminance conversion processing (step S107) according to the display mode is performed by the SDR display. That is, the second luminance conversion is the inverse luminance conversion of the third luminance conversion.

By the aforementioned processing, the second luminance conversion converts the display luminance value in the luminance range of the display (input luminance value), which is the second luminance range, into the luminance value of SDR in the luminance range of SDR (output luminance value), which is the third luminance range.

In the second luminance conversion, a conversion equation is switched according to the display mode of the SDR display. For example, when the display mode of the SDR display is the normal mode, the luminance conversion is performed to a direct proportion value in direct proportion to the display luminance value. In the second luminance conversion, when the display mode of the SDR display is the dynamic mode in which a high-luminance pixel becomes brighter and a low-luminance pixel becomes darker than pixels in the normal mode, the luminance conversion is performed by using an inverse function thereof so that the luminance value of SDR of the low-luminance pixel is converted into a value higher than the direct proportion value in direct proportion to the display luminance value, and that the luminance value of SDR of the high-luminance pixel is converted into a value lower than the direct proportion value in direct proportion to the display luminance value. That is, in the second luminance conversion, regarding the display luminance value determined in step S102, by using luminance-related information according to the display characteristic information which is information indicating the display characteristic of the SDR display, the luminance value associated with the display luminance value is determined as the luminance value of SDR, and the luminance conversion processing is switched according to the display characteristic information. Here, the luminance-related information according to the display characteristic information refers, for example as illustrated in FIG. 14, to information that associates the display luminance value (input luminance value) with the luminance value of SDR (output luminance value) defined for each display parameter of the SDR display (display mode).

[1-15. Display Settings]

Figure 15:
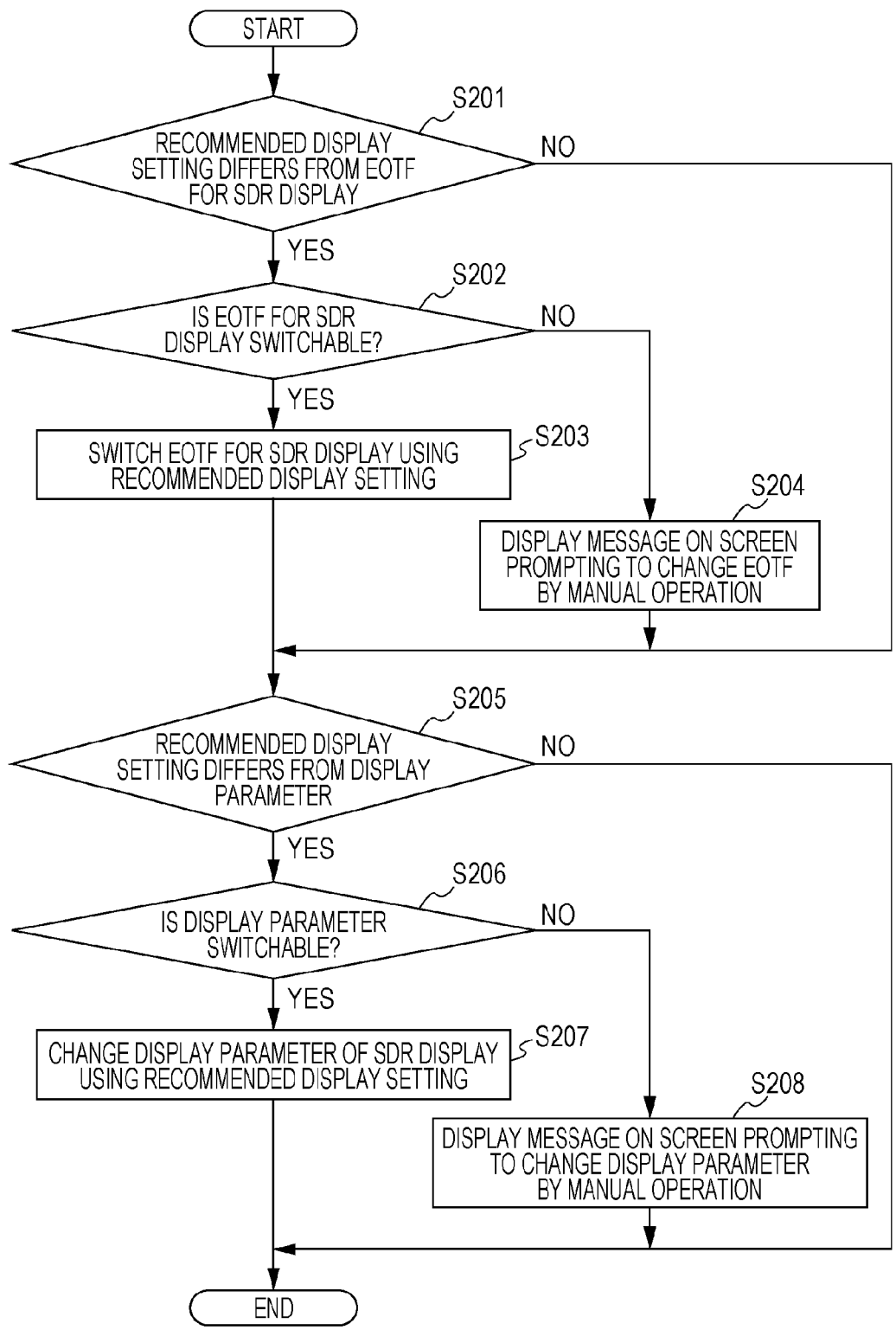
FIG. 15 is a flowchart illustrating detailed processing of display settings.

Next, details of the display settings of step S105 will be described with reference to FIG. 15. FIG. 15 is a flowchart illustrating detailed processing of the display settings.

In step S105, display setting unit 201 of the SDR display performs step S201 to step S208 described below.

First, display setting unit 201 uses the setting information to determine whether EOTF that is set for the SDR display (EOTF for SDR display) is consistent with EOTF assumed at a time of generation of the pseudo HDR video (SDR signal) (S201).

When display setting unit 201 determines that EOTF that is set for the SDR display differs from EOTF indicated by the setting information (EOTF consistent with the pseudo HDR video) (Yes in S201), display setting unit 201 determines whether EOTF for the SDR display is switchable on a system side (S202).

When display setting unit 201 determines that EOTF for the SDR display is switchable, display setting unit 201 uses the setting information to switch EOTF for the SDR display to appropriate EOTF (S203).

From step S201 to step S203, in setting of the display settings (S105), display setting unit 201 sets EOTF that is set for the SDR display as recommended EOTF according to the acquired setting information. This allows determination of the luminance value of SDR by using the recommended EOTF in step S106 to be performed after step S105.

When display setting unit 201 determines that EOTF for the SDR display is not switchable on the system side (No in S202), display setting unit 201 displays a message on a screen prompting the user to change EOTF by manual operation (S204). For example, display setting unit 201 displays a message on the screen saying "Set display gamma to 2.4". That is, when display setting unit 201 cannot switch EOTF that is set for the SDR display in setting of the display settings (S105), display setting unit 201 displays the message on the SDR display for prompting the user to switch EOTF that is set for the SDR display (EOTF for the SDR display) to the recommended EOTF.

Next, although the SDR display displays the pseudo HDR video (SDR signal), before the display, display setting unit 201 uses the setting information to determine whether the display parameter of the SDR display matches the setting information (S205).

When display setting unit 201 determines that the display parameter that is set for the SDR display differs from the setting information (Yes in S205), display setting unit 201 determines whether the display parameter of the SDR display is switchable (S206).

When display setting unit 201 determines that the display parameter of the SDR display is switchable (Yes in S206), display setting unit 201 switches the display parameter of the SDR display in accordance with the setting information (S207).

From step S204 to step S207, in setting of the display settings (S105), display setting unit 201 sets the display parameter that is set for the SDR display as a recommended display parameter according to the acquired setting information.

When display setting unit 201 determines that the display parameter of the SDR display is not switchable on the system side (No in S206), display setting unit 201 displays a message on the screen prompting the user to change the display parameter that is set for the SDR display by manual operation (S208). For example, display setting unit 201 displays a message on the screen saying "Set display mode to dynamic mode, and increase back light to maximum level". That is, in setting (S105), when the display parameter that is set for the SDR display cannot be switched, display setting unit 201 displays the message on the SDR display for prompting the user to switch the display parameter that is set for the SDR display to the recommended display parameter.

[1-16. Third Luminance Conversion]

Figure 16:
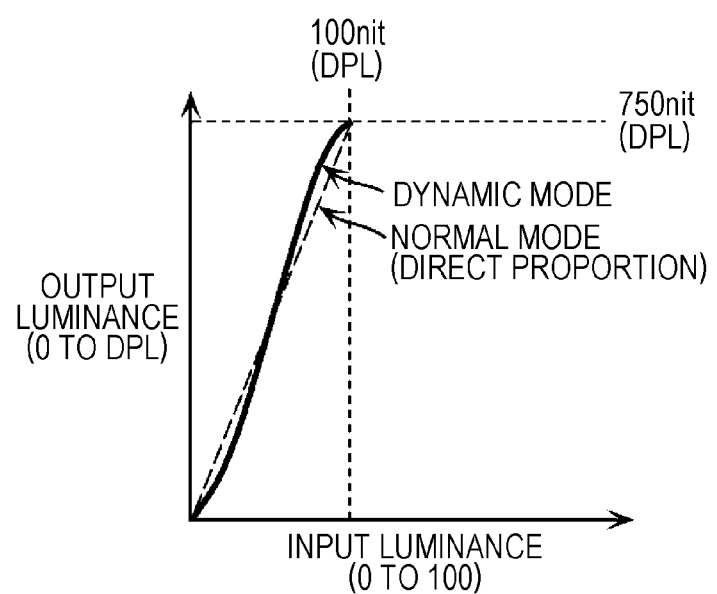
FIG. 16 is a diagram illustrating third luminance conversion.

Next, details of the third luminance conversion of step S107 (100 to DPL [nit]) will be described with reference to FIG. 16. FIG. 16 is a diagram illustrating the third luminance conversion.

Luminance converter 203 of display apparatus 200 converts the luminance value of SDR in the luminance range of SDR (0 to 100 [nit]) into (0 to DPL [nit]) according to the display mode that is set in step S105. This processing is performed so as to become an inverse function of the inverse luminance conversion for each mode of S103.

In the third luminance conversion, the conversion equation is switched according to the display mode of the SDR display. For example, when the display mode of the SDR display is the normal mode (that is, when the set display parameter is a parameter compatible with the normal mode), the luminance conversion of the display luminance value is performed to the direct proportion value in direct proportion to the luminance value of SDR. In the third luminance conversion, when the display mode of the SDR display is the dynamic mode in which a high-luminance pixel becomes brighter and a low-luminance pixel becomes darker than pixels in the normal mode, the luminance conversion is performed so that the display luminance value of the low-luminance pixel is converted into a value lower than the direct proportion value in direct proportion to the luminance value of SDR, and that the display luminance value of the high-luminance pixel is converted into a value higher than the direct proportion value in direct proportion to the luminance value of SDR. That is, in the third luminance conversion, regarding the luminance value of SDR determined in step S106, by using luminance-related information according to the display parameter indicating the display settings of the SDR display, the luminance value associated in advance with the luminance value of SDR is determined as the display luminance value, and the luminance conversion processing is switched according to the display parameter. Here, the luminance-related information according to the display parameter refers, for example as illustrated in FIG. 16, to information that associates the luminance value of SDR (input luminance value) with the display luminance value (output luminance value) defined for each display parameter of the SDR display (display mode).

[1-17. Advantageous Effects, Etc.]

A normal SDR TV, whose input signal is 100 nit, has capability of visual representation of 200 nit or more adapted to viewing environments (dark room: cinema mode, bright room: dynamic mode, etc.). However, since a luminance upper limit of the input signal to the SDR TV is determined as 100 nit, the capability cannot be used directly.

In a case of displaying the HDR video on the SDR TV, by making use of the fact that the peak luminance of the SDR TV for display exceeds 100 nit (normally 200 nit or more), "HDR to pseudo HDR conversion processing" is performed so that gradation of the luminance range exceeding 100 nit be maintained to some extent, instead of conversion of the HDR video into the SDR video of 100 nit or less. Therefore, the HDR video may be displayed on the SDR TV as a pseudo HDR video close to the original HDR video.

Figure 17:
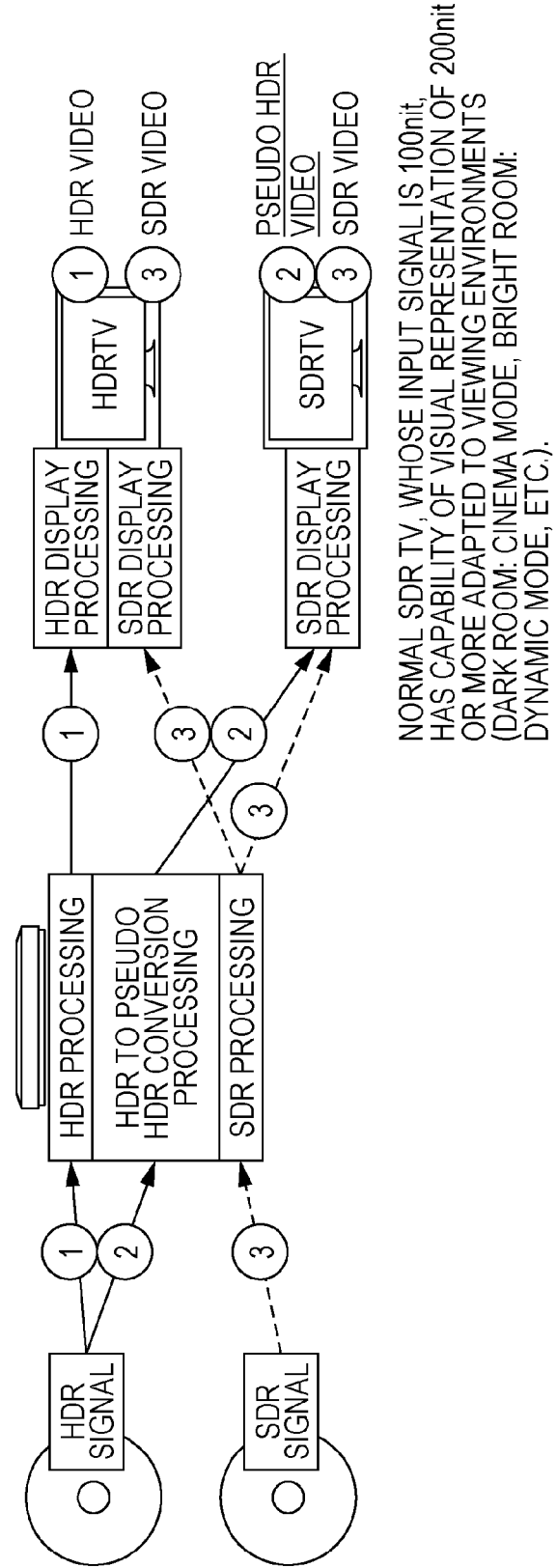
FIG. 17 is a diagram illustrating conversion processing from HDR to pseudo HDR.

When this "HDR to pseudo HDR conversion processing" technique is applied to Blu-ray with an HDR disc storing only the HDR signal and the SDR TV connected to the Blu-ray device as illustrated in FIG. 17, the Blu-ray device performs the "HDR to pseudo HDR conversion processing", converts the HDR signal into the pseudo HDR signal, and sends the pseudo HDR signal to the SDR TV. This allows the SDR TV to display a video with a pseudo HDR effect by converting the received pseudo HDR signal into a luminance value. Thus, even where there is no HDR-enabled TV, when the HDR-enabled BD and HDR-enabled Blu-ray device are prepared, even the SDR TV can display the pseudo HDR video with higher display quality than that of the SDR video.

Therefore, although it has been considered that the HDR-enabled TV is required for watching the HDR video, the pseudo HDR video that provides feeling of an HDR-like effect can be watched on the existing SDR TV. Accordingly, wide use of HDR-enabled Blu-ray is expected.

The HDR signal sent by broadcast, package media such as Blu-ray, and Internet delivery such as OTT is converted into the pseudo HDR signal by performing the HDR-pseudo HDR conversion processing. This allows the HDR signal to be displayed on the existing SDR TV as the pseudo HDR video.

Other Exemplary Embodiments

As described above, the exemplary embodiment has been described by way of example of the technique to be disclosed in this application. However, the technique in the present disclosure is not limited to this example, and is also applicable to the exemplary embodiment to which change, replacement, addition, omission, etc. are made as appropriate. It is also possible to make a new exemplary embodiment by combining components described in the aforementioned exemplary embodiment.

Therefore, other exemplary embodiment will be illustrated below.

The HDR video is, for example, a video within a Blu-ray disc, DVD, video delivery site on the Internet, broadcast, and HDD.

Conversion apparatus 100 (HDR to pseudo HDR conversion processor) may exist within a disc player, disc recorder, set-top box, TV, personal computer, and smart phone. Conversion apparatus 100 may exist within a server apparatus on the Internet.

Display apparatus 200 (SDR display unit) is, for example, a TV, personal computer, and smart phone.

The display characteristic information to be acquired by conversion apparatus 100 may be acquired from display apparatus 200 through an HDMI cable or LAN cable by using HDMI or other communication protocols. As the display characteristic information to be acquired by conversion apparatus 100, display characteristic information included in model information on display apparatus 200, etc. may be acquired via the Internet. The user may perform manual operation to set the display characteristic information in conversion apparatus 100. Acquisition of the display characteristic information by conversion apparatus 100 may be performed immediately before pseudo HDR video generation (steps S101 to S104), and may be performed with timing of initial setting of a device or display connection. For example, acquisition of the display characteristic information may be performed immediately before conversion into the display luminance value, and may be performed with timing with which conversion apparatus 100 is connected to display apparatus 200 with an HDMI cable for the first time.

One set of information items including CPL and CAL of the HDR video may exist per one piece of content, and may exist for each scene. That is, in the conversion method may be acquired luminance information (CPL, CAL) compatible with each of a plurality of scenes in a video, the luminance information including, for each of the scenes, at least one of a first maximum luminance value which is a maximum value out of the luminance values of a plurality of images that constitute the scene, and an average luminance value which is an average of the luminance values of the plurality of images that constitute the scene. In the first luminance conversion, the display luminance value may be determined in accordance with luminance information corresponding to each of the plurality of scenes.

CPL and CAL may be provided in a medium (such as a Blu-ray disc and DVD) identical to a medium of the HDR video, and may be acquired from a place different from the HDR video, such as conversion apparatus 100 acquires CPL and CAL from the Internet. That is, the luminance information including at least one of CPL and CAL may be acquired as metadata information on the video, and may be acquired via a network.

In the first luminance conversion of conversion apparatus 100 (HPL to DPL), CPL, CAL, and the display peak luminance (DPL) may not be used, and fixed values may be used. The fixed values may be changeable from outside. CPL, CAL, and DPL may be switched among several types, for example, DPL may be only three types including, 200 nit, 400 nit, and 800 nit, and a value closest to the display characteristic information may be used.

EOTF of HDR may not be SMPTE 2084, and EOTF of HDR of another type may be used. The maximum luminance of the HDR video (HPL) may not be 10,000 nit, and may be, for example, 4,000 nit or 1,000 nit.

A bit width of the code value may be, for example, 16, 14, 12, 10, or 8 bits.

Although inverse EOTF conversion of SDR is determined from the display characteristic information, a fixed (changeable from outside) conversion function may be used. Inverse EOTF conversion of SDR may use, for example, a function prescribed by Rec. ITU-R BT.1886. Types of inverse EOTF conversion of SDR may be limited to several types, and a type closest to an input-output characteristic of display apparatus 200 may be selected and used.

A fixed mode may be used as the display mode, and the display mode may not be included in the display characteristic information.

Conversion apparatus 100 may not transmit the setting information, display apparatus 200 may use fixed display settings, and may not change the display settings. In this case, display setting unit 201 is unnecessary. The setting information may be flag information indicating whether a video is the pseudo HDR video, and for example, when a video is the pseudo HDR video, settings may be changed to brightest display. That is, in setting of the display settings (S105), when the acquired setting information indicates a signal indicating the pseudo HDR video that is converted using DPL, brightness settings of display apparatus 200 may be switched to settings of brightest display.

The first luminance conversion (HPL to DPL) of conversion apparatus 100 is performed by the next formula, for example.

[Mathematical expression 1]

$$V = \begin{cases} L & \text{for } 0 \Leftarrow L < S1 \\ a*\ln(L) + b & \text{for } S1 \Leftarrow L < S2 \\ M & \text{for } S2 \Leftarrow L \end{cases}$$

Here, L denotes a luminance value normalized to 0 to 1, and S1, S2, a, b, and M are values to be set based on CAL, CPL, and DPL. ln is a natural logarithm. V is a converted luminance value normalized to 0 to 1. As in the example of FIG. 13A, when CAL is 300 nit, CPL is 2,000 nit, DPL is 750 nit, conversion is not performed until CAL+50 nit, and conversion is performed for 350 nit or more, respective values are as follows, for example.
S1=350/10,000
S2=2,000/10,000
M=750/10,000
a=0.023
b=S1−a*ln(S1)=0.112105

That is, in the first luminance conversion, when the luminance value of SDR is between the average luminance value (CAL) and the first maximum luminance value (CPL), the display luminance value corresponding to the luminance value of HDR is determined using a natural logarithm.

By converting the HDR video by using information including the content peak luminance and content average luminance of the HDR video, the conversion equation may be changed according to content, and it is possible to perform conversion so that gradation of HDR may be maintained as much as possible. It is also possible to inhibit an adverse effect such as too dark and too bright. Specifically, by mapping the content peak luminance of the HDR video on the display peak luminance, gradation is maintained as much as possible. In addition, overall brightness is kept from changing by not changing a pixel value equal to or less than vicinity of the average luminance.

By using the peak luminance value and the display mode of the SDR display to convert the HDR video, the conversion equation may be changed in accordance with display environments of the SDR display. In accordance with performance of the SDR display, a video with feeling of HDR (pseudo HDR video) may be displayed with gradation and brightness similar to gradation and brightness of an original HDR video. Specifically, by determining the display peak luminance in accordance with the maximum luminance and display mode of the SDR display, and by converting the HDR video so as not to exceed the peak luminance value, the HDR video is displayed with little reduction in gradation of the HDR video until brightness that is displayable by the SDR display. For non-displayable brightness levels, the luminance value is decreased to a displayable brightness level.

This makes it possible to reduce non-displayable brightness information, and to display video in a form close to the original HDR video without reducing gradation of displayable brightness. For example, for a display with a peak luminance of 1,000 nit, overall brightness is maintained by conversion into the pseudo HDR video with a peak luminance reduced to 1,000 nit, and the luminance value changes depending on the display mode of the display. Therefore, the conversion equation of luminance is changed according to the display mode of the display. If luminance greater than the peak luminance of the display is allowed in the pseudo HDR video, such great luminance may be replaced with the peak luminance on the display side for display. In this case, the display becomes darker than the original HDR video on the whole. In contrast, when the conversion is performed with the luminance smaller than the peak luminance of the display as the maximum luminance, such small luminance is replaced with the peak luminance on the display side, and the display becomes brighter than the original HDR video on the whole. Moreover, this does not make the most of performance regarding gradation of the display because the luminance is smaller than the peak luminance on the display side.

On the display side, this makes it possible to better display the pseudo HDR video by switching the display settings by using the setting information. For example, when brightness is set to dark, high-luminance display is not possible, and thus feeling of HDR is impaired. In this case, by changing the display settings or by displaying a message prompting to change the display settings, maximum performance of the display is brought out, and a high-gradation video may be displayed.

In content such as Blu-ray, a video signal and a graphics signal, such as subtitles and menus, are multiplexed as independent data. During playback, each signal is decoded individually, and decoding results are composited and displayed. Specifically, a plane of subtitles or menus is superimposed on a plane of the video.

Here, even if the video signal is HDR, the graphics signal of subtitles or menus may be SDR. In HPL to DPL conversion of the video signal, the following two kinds of conversion (a) and (b) are possible.

(a) When HPL to DPL conversion is performed after composition of graphics.
  1. Convert EOTF of the graphics from EOTF of SDR into EOTF of HDR.
  2. Composite the graphics after EOTF conversion with the video.
  3. Perform HPL to DPL conversion on a composite result.
(b) When HPL to DPL conversion is performed prior to composition of graphics.
  1. Convert EOTF of the graphics from EOTF of SDR into EOTF of HDR.
  2. Perform HPL to DPL conversion on the video.
  3. Composite the graphics after EOTF conversion with the video after DPL conversion.

For (b), order of 1 and 2 may be interchanged.

Although peak luminance of the graphics is 100 nit both in scheme (a) and scheme (b), for example, if DPL is high luminance as high as 1000 nit, luminance of the graphics which remains 100 nit may lead to reduction in the luminance of the graphics of the video after HPL to DPL conversion. In particular, a bad influence is assumed such as dark subtitles superimposed on the video. Accordingly, the luminance of the graphics may also be converted according to a value of DPL. For example, a rule of proportion of the luminance of subtitles to the DPL value may be determined in advance, and the luminance of subtitles may be converted based on a setting value. Graphics other than subtitles, such as menus, can be processed similarly.

A playback operation of the HDR disc that stores only the HDR signal has been described above.

Figure 18:
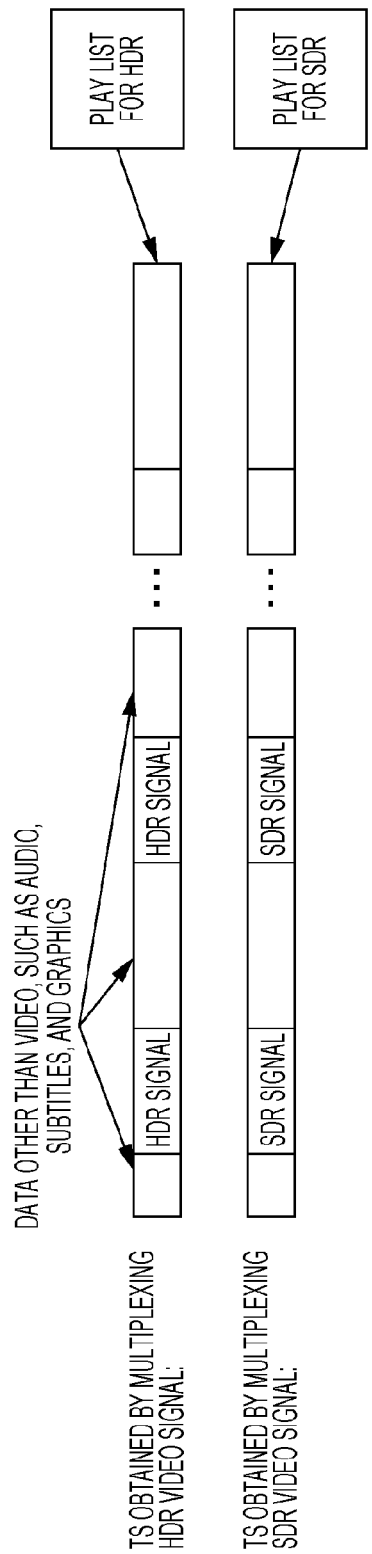
FIG. 18 is a diagram illustrating a playback operation of a dual disc.

Next, multiplex data to be stored in the dual disc that stores both the HDR signal and the SDR signal illustrated in Case 2 of FIG. 6B will be described with reference to FIG. 18. FIG. 18 is a diagram illustrating the multiplex data to be stored in the dual disc.

In the dual disc, as illustrated in FIG. 18, the HDR signal and the SDR signal are stored as multiplex streams different from each other. For example, in an optical disc such as Blu-ray, data of a plurality of media, such as video, audio, subtitles, and graphics, is stored as one multiplex stream by an MPEG-2TS-based multiplexing scheme called M2TS. These multiplex streams are referenced from metadata for playback control, such as a play list. During playback, a player selects the multiplex stream to be played, or data of individual language stored in the multiplex stream by analyzing the metadata. This example indicates a case where the play list for HDR and the play list for SDR are stored individually, and where each play list references the HDR signal or the SDR signal. Identification information or the like indicating that both the HDR signal and the SDR signal are stored may be indicated separately.

Although it is possible to multiplex both the HDR signal and the SDR signal in an identical multiplex stream, it is necessary for such multiplexing to satisfy a buffer model, such as System Target Decoder (T-STD) prescribed in MPEG-2TS. In particular, it is difficult to multiplex two videos with high bit rate within a range of a predetermined data reading rate. Therefore, preferably the multiplex streams are separated.

It is necessary to store data of audio, subtitles, graphics, etc. in each multiplex stream, and data volume increases as compared with multiplexing in one stream. However, against the increase in the data volume, the data volume of video can be reduced by using a video coding scheme with a high compression ratio. For example, changing MPEG-4 AVC used in conventional Blu-ray into High Efficiency Video Coding (HEVC) is expected to provide improvement in the compression ratio by a factor of 1.6 to 2. Only a combination that fits into capacity of an optical disc may be allowed to be stored in a dual disc, such as storing a combination of two 2K streams or a combination of a 4K stream and a 2K stream, including a combination of a 2K HDR stream and a 2K SDR stream, and a combination of a 4K SDR stream and a 2K HDR stream, by prohibiting storage of two 4K streams.

FIG. 19 is a flowchart illustrating a playback operation of the dual disc.

First, the playback apparatus determines whether an optical disc to be played is a dual disc (S301). When it is determined that the optical disc to be played is a dual disc (Yes in S301), the playback apparatus determines whether an output destination TV is an HDR TV or SDR TV (S302). When it is determined that the TV is an HDR TV (Yes in S302), the processing advances to step S303. When it is determined that the TV is an SDR TV (No in S302), the processing advances to step S304. In step S303, the playback apparatus acquires a video signal of HDR from the multiplex stream including the HDR signal within the dual disc, and decodes and outputs the video signal to the HDR TV. In step S304, the playback apparatus acquires a video signal of SDR from the multiplex stream including the SDR signal within the dual disc, and decodes and outputs the video signal to the SDR TV. When it is determined in step S301 that the optical disc to be played is not a dual disc (No in S301), the playback apparatus determines whether playback is possible by a predetermined method, and decides a playback method based on a result of the determination (S305).

In a case of displaying the HDR video on the SDR TV in the conversion method of the present disclosure, by making use of the fact that the peak luminance of the SDR TV for display exceeds 100 nit (normally 200 nit or more), "HDR to pseudo HDR conversion processing" is implemented that allows conversion of the HDR video into a pseudo HDR video similar to an original HDR and display on the SDR TV, by converting the HDR video while maintaining gradation of a region exceeding 100 nit to some extent, instead of conversion of the HDR video into the SDR video of 100 nit or less.

In this conversion method, the conversion method of the "HDR to pseudo HDR conversion processing" may be switched in accordance with the display characteristic of the SDR TV (maximum luminance, input-output characteristic, and display mode).

Conceivable acquisition methods of display characteristic information include (1) automatic acquisition through HDMI or a network, (2) generation by causing the user to input information such as a manufacturer name and model number, and (3) acquisition from a cloud, etc. using the information such as the manufacturer name and the model number.

Conceivable acquisition timing of the display characteristic information by conversion apparatus 100 includes (1) acquisition immediately before pseudo HDR conversion, and (2) when connected to display apparatus 200 (such as the SDR TV) for the first time (when the connection is established).

In this conversion method, the conversion method may be switched in accordance with luminance information on the HDR video (CAL, CPL).

Examples of the conceivable acquisition method of the luminance information on the HDR video by conversion apparatus 100 include (1) acquisition as metadata information appended to the HDR video, (2) acquisition by causing the user to input title information on content, and (3) acquisition from a cloud, etc. using input information that is input by the user.

Details of the conversion method include (1) conversion so that the luminance would not exceed DPL, (2) conversion so that CPL would become DPL, (3) not changing the luminance equal to or less than CAL and vicinity thereof, (4) conversion using a natural logarithm, and (5) clip processing at DPL.

In order to enhance an effect of pseudo HDR, this conversion method may include transmitting display settings such as a display mode and display parameter of the SDR TV to display apparatus 200 for switching. For example, a message prompting the user to make display settings may be displayed on a screen.

In the aforementioned exemplary embodiment, each component may be made of dedicated hardware, or may be implemented through execution of a software program suitable for each component. Each component may be implemented by a program execution unit, such as a CPU or a processor, reading and executing the software program recorded in a recording medium such as a hard disk or a semiconductor memory.

Although the display method and the display apparatus according to one or more aspects of the present disclosure have been described above on the basis of the exemplary embodiment, the present disclosure is not limited to this exemplary embodiment. The exemplary embodiment to which various modifications conceivable by a person skilled in the art are made, and aspects that are made by combining elements of different exemplary embodiment may also be within the scope of the one or more aspects of the present disclosure as long as such aspects do not depart from the gist of the present disclosure.

The present disclosure is useful as a conversion method, conversion apparatus, and the like that can appropriately convert luminance in the first luminance range into luminance in the second luminance range with reduced luminance range.

What is claimed is:

1. A display apparatus comprising: a memory; and processing circuitry which, in operation, preforms operations including:
   receiving a video signal having a first luminance range and performing electro-optical transfer function (EOTF) conversion on a video signal having a first luminance range to generate a video linear signal having the first luminance range;
   receiving a graphics signal having a third luminance range and performs performing EOTF conversion on a graphics signal having a third luminance range to generate a graphics linear signal having the first luminance range;
   combining the video linear signal with the graphics linear signal to generate a composite signal having the first luminance range;
   converting the first luminance range of the composite signal into a second luminance range, a maximum value of the second luminance range being smaller than a maximum value of the first luminance range, and the maximum value of the second luminance range being larger than a maximum value of the third luminance range; and
   wherein the display apparatus further comprises a display that displays the composite signal, based on the second luminance range.

2. The display apparatus according to claim 1, wherein the graphics signal is a signal for displaying a subtitle or a menu.

3. The display apparatus according to claim 1, wherein the video signal is a high dynamic range (HDR) signal having the first luminance range, and
   the graphics signal is a standard dynamic range (SDR) signal having the third luminance range.

4. A display method comprising:
   receiving a video signal having a first luminance range and performing electro-optical transfer function (EOTF) conversion on the video signal to generate a video linear signal having the first luminance range;
   receiving a graphics signal having a third luminance range and performing EOTF conversion on the graphics signal to generate a graphics linear signal having the first luminance range;
   combining the video linear signal with the graphics linear signal to generate a composite signal having the first luminance range;
   converting the first luminance range of the composite signal into a second luminance range, a maximum value of the second luminance range being smaller than a maximum value of the first luminance range, and the maximum value of the second luminance range being larger than a maximum value of the third luminance range; and
   displaying the composite signal, based on the second luminance range.

* * * * *